US009183655B2

(12) United States Patent (10) Patent No.: US 9,183,655 B2
Baker et al. (45) Date of Patent: Nov. 10, 2015

(54) VISUAL SCENES FOR TEACHING A PLURALITY OF POLYSEMOUS SYMBOL SEQUENCES AND CORRESPONDING RATIONALES

(71) Applicants: Bruce R. Baker, Pittsburgh, PA (US); Thomas R. Kovacs, Pittsburgh, PA (US); Deborah L. Witkowski, Venetia, PA (US)

(72) Inventors: Bruce R. Baker, Pittsburgh, PA (US); Thomas R. Kovacs, Pittsburgh, PA (US); Deborah L. Witkowski, Venetia, PA (US)

(73) Assignee: SEMANTIC COMPACTION SYSTEMS, INC., Pittsburgh, PA (US)

( * ) Notice: Subject to any disclaimer, the term of this patent is extended or adjusted under 35 U.S.C. 154(b) by 266 days.

(21) Appl. No.: 13/827,937

(22) Filed: Mar. 14, 2013

(65) Prior Publication Data

US 2014/0028723 A1 Jan. 30, 2014

Related U.S. Application Data

(60) Provisional application No. 61/676,491, filed on Jul. 27, 2012.

(51) Int. Cl.
*G06T 11/60* (2006.01)
*G09G 5/377* (2006.01)
(Continued)

(52) U.S. Cl.
CPC .............. *G06T 11/60* (2013.01); *G06F 3/0482* (2013.01); *G06F 3/04817* (2013.01);
(Continued)

(58) Field of Classification Search
CPC . G06F 3/0482; G06F 3/04886; G06F 3/0236; G06F 3/0238; G06F 3/04817; G06F 3/0489; G06F 21/36; G06F 17/2735; G09G 2314/12; G09G 5/377
USPC ......... 345/629, 173, 168, 172, 169, 589, 592; D14/485, 489, 492; 178/18.01, 18.03; 704/10, 276, 235, 260, 271; 715/835, 715/259, 763, 764, 771, 773, 808, 825, 840, 715/866
See application file for complete search history.

(56) References Cited

U.S. PATENT DOCUMENTS 4,661,916 A 4/1987 Baker et al.
5,097,425 A 3/1992 Baker et al.
(Continued)

FOREIGN PATENT DOCUMENTS

KR 10-2011-0046434 5/2011

OTHER PUBLICATIONS

International Search Report and Written Opinion for PCT/US2013/052232 dated Nov. 1, 2013.
(Continued)

*Primary Examiner* — Jin-Cheng Wang
(74) *Attorney, Agent, or Firm* — Harness, Dickey & Pierce, P.L.C.

(57) ABSTRACT

A method includes displaying a second electronic screen overlay on a display, in response to an initial selection of one of provided polysemous symbols, the second electronic screen overlay being the electronic screen overlay associated with the selected polysemous symbol; storing, in the memory, a plurality of visual scenes, each respective one of the plurality of visual scenes being stored in association with at least two symbol sequences beginning with the initially selected polysemous symbol; and displaying one of the plurality of visual scenes on the display, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

15 Claims, 10 Drawing Sheets

(51) Int. Cl.
*G06F 17/27* (2006.01)
*G06F 3/0482* (2013.01)
*G06F 17/30* (2006.01)
*G09G 5/14* (2006.01)
*G06F 3/0488* (2013.01)
*G06F 3/0481* (2013.01)

(52) U.S. Cl.
CPC ....... *G06F 3/04886* (2013.01); *G06F 17/2735* (2013.01); *G06F 17/30386* (2013.01); *G06F 17/30637* (2013.01); *G09G 5/14* (2013.01); *G09G 5/377* (2013.01); *G09G 2340/12* (2013.01); *G09G 2354/00* (2013.01)

(56) References Cited

U.S. PATENT DOCUMENTS

| | | | |
|---|---|---|---|
| 5,210,689 | A | 5/1993 | Baker et al. |
| 5,297,041 | A | 3/1994 | Kushler et al. |
| 5,748,177 | A | 5/1998 | Baker et al. |
| 5,920,303 | A | 7/1999 | Baker et al. |
| 6,323,846 | B1 | 11/2001 | Westerman et al. |
| 6,570,557 | B1 | 5/2003 | Westerman et al. |
| 6,646,573 | B1 | 11/2003 | Kushler et al. |
| 6,677,932 | B1 | 1/2004 | Westerman |
| 6,778,995 | B1 | 8/2004 | Gallivan |
| 7,076,738 | B2 | 7/2006 | Baker et al. |
| 7,319,957 | B2 | 1/2008 | Robinson et al. |
| 7,506,256 | B2 | 3/2009 | Baker et al. |
| 7,614,008 | B2 | 11/2009 | Ording |
| 7,626,574 | B2 | 12/2009 | Kim |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,672,950 | B2 | 3/2010 | Eckardt, III et al. |
| 7,679,534 | B2 | 3/2010 | Kay et al. |
| 7,712,053 | B2 | 5/2010 | Bradford et al. |
| 7,720,682 | B2 | 5/2010 | Stephanick et al. |
| 7,844,914 | B2 | 11/2010 | Andre et al. |
| 7,881,936 | B2 | 2/2011 | Longe et al. |
| 7,966,578 | B2 | 6/2011 | Tolmasky et al. |
| 8,065,154 | B2 | 11/2011 | Schindler et al. |
| 8,095,364 | B2 | 1/2012 | Longe et al. |
| 8,234,589 | B2 | 7/2012 | Baker et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,381,137 | B2 | 2/2013 | Bradford et al. |
| 8,402,026 | B2 | 3/2013 | Gallivan |
| 8,577,279 | B2 | 11/2013 | Baker et al. |
| 2002/0015024 | A1 | 2/2002 | Westerman et al. |
| 2002/0163544 | A1 | 11/2002 | Baker et al. |
| 2002/0196163 | A1 | 12/2002 | Bradford et al. |
| 2003/0210280 | A1* | 11/2003 | Baker et al. ............... 345/835 |
| 2005/0010555 | A1 | 1/2005 | Gallivan |
| 2005/0017954 | A1 | 1/2005 | Kay et al. |
| 2005/0192802 | A1 | 9/2005 | Robinson et al. |
| 2005/0234722 | A1 | 10/2005 | Robinson et al. |
| 2005/0283358 | A1 | 12/2005 | Stephanick et al. |
| 2005/0283364 | A1 | 12/2005 | Longe et al. |
| 2006/0026521 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0106847 | A1 | 5/2006 | Eckardt, III et al. |
| 2006/0122838 | A1* | 6/2006 | Schindler et al. ............ 704/271 |
| 2006/0148520 | A1 | 7/2006 | Baker et al. |
| 2006/0190256 | A1 | 8/2006 | Stephanick et al. |
| 2006/0197753 | A1 | 9/2006 | Hotelling |
| 2006/0247915 | A1 | 11/2006 | Bradford et al. |
| 2007/0106492 | A1 | 5/2007 | Kim |
| 2007/0110222 | A1 | 5/2007 | Kim |
| 2007/0152980 | A1 | 7/2007 | Kocienda et al. |
| 2007/0255570 | A1 | 11/2007 | Annaz et al. |
| 2008/0233546 | A1* | 9/2008 | Baker et al. ............... 434/169 |
| 2009/0150828 | A1 | 6/2009 | Baker et al. |
| 2010/0106752 | A1 | 4/2010 | Eckardt, III et al. |
| 2010/0122164 | A1 | 5/2010 | Kay et al. |
| 2010/0174529 | A1 | 7/2010 | Bradford et al. |
| 2011/0010174 | A1 | 1/2011 | Longe et al. |
| 2011/0106743 | A1 | 5/2011 | Duchon |
| 2012/0174035 | A1 | 7/2012 | Baker et al. |
| 2013/0065204 | A1 | 3/2013 | LoStracco et al. |
| 2013/0194191 | A1 | 8/2013 | Bradford et al. |
| 2013/0212098 | A1 | 8/2013 | Gallivan |
| 2014/0111689 | A1 | 4/2014 | Kim et al. |

OTHER PUBLICATIONS

International Search Report and Written Opinion for PCT/US2013/052217 dated Nov. 1, 2013.
U.S. Office Action for corresponding U.S. Appl. No. 13/827,156 mailed Sep. 12, 2014.
U.S. Office Action for corresponding U.S. Appl. No. 13/826,504 mailed Aug. 13, 2014.
U.S. Office Action for corresponding U.S. Appl. No. 14/416,017 mailed Jul. 21, 2015.
U.S. Office Action for corresponding U.S. Appl. No. 13/826,661 mailed Jul. 8, 2015.
U.S. Office Action for corresponding U.S. Appl. No. 14/416,023 mailed Jul. 13, 2015.
U.S. Notice of Allowance for corresponding U.S. Appl. No. 13/826,504 mailed Jun. 30, 2015.
U.S. Notice of Allowance for corresponding U.S. Appl. No. 13/827,156 mailed Aug. 3, 2015.

* cited by examiner

Figure 6 600

| | | |
|---|---|---|
| big |  | Elephants are BIG. |
| can I |  | Pour the CAN of juice into the glass. Girl points to herself, I. |
| drop |  | When the elephant DROPS something, it will fall down. |
| fat |  | Elephant represents big sizes. Some people are FAT. |
| heavy |  | Elephants can lift HEAVY things. The sun is HEAVY. |
| I can |  | Girl points to herself, I. Pour the CAN of juice into the glass. |
| large |  | Elephants are big. LARGE is another word for big. |
| lift |  | The elephant can LIFT things with it's trunk. |
| meet |  | One elephant's trunk MEETs the other elephant's tail. |
| paint |  | You can PAINT a room in your house with any color of the rainbow. |
| power |  | Elephants and trucks both have a lot of POWER. |
| powerful |  | Elephants and trucks are both POWERFUL. |
| strong |  | Give a thumb's up to elephants that are STRONG. |
| thick | 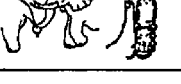 | Elephants have THICK skin. Some books are very THICK. |
| weak |  | The opposite of strong is WEAK. |

605   615   625

VISUAL SCENES FOR TEACHING A PLURALITY OF POLYSEMOUS SYMBOL SEQUENCES AND CORRESPONDING RATIONALES

PRIORITY STATEMENT

The present application hereby claims priority under 35 U.S.C. §119(e) to U.S. provisional patent application No. 61/676,491 filed Jul. 27, 2012, the entire contents of which are hereby incorporated herein by reference.

FIELD

The present application generally relates to an apparatus and method using polysemous (multi-meaning) symbols.

BACKGROUND

A system and method for producing synthetic single or plural word messages was developed by Bruce Baker et al. and is disclosed in U.S. Pat. No. 4,661,916 to Baker et al. (the Baker '916 patent) issued on Apr. 28, 1987, the entire contents of which are hereby incorporated herein by reference. The system was directed to a linguistic coding system and keyboard for use by people with cognitive and/or physical impairments. The coding system and associated keyboard was used to store and access messages, which included words, plural word messages, phonemes, sentences, phrases, full names, letters, numbers, functions, or any combination thereof.

In such a system, the keyboard was coupled to a computer device, or was alternately part of the stand-alone entity which included a microprocessor, memory and display. The memory stored the messages for selective retrieval by the keyboard. The messages retrieved from the keyboard were then fed to a voice synthesizer, for example, which converted them through a loudspeaker to produce audible spoken messages. On this keyboard, associated with each of a plurality of keys, were polysemous (multi-meaning) symbols, also known as icons. By designating selected ones of the keys and their associated symbols or icons, selected stored messages or plural word messages (including but not limited to words, phrases and sentences) were accessed from the memory and then subsequently output.

With the system described in the Baker '916 patent, messages stored in the memory could be retrieved by activating a combination of symbol keys and other keys to vary the context of the polysemous symbols. Thus, a plurality of sentences could be selectively generated as a function of polysemous symbols in combination with other polysemous symbols. This allowed a user the ability to access thousands of words or messages based upon as little as one, two, or three keystrokes. Further, with symbols being polysemous, thousands of symbol sequences could be generated with only a small number of keys on a keyboard. Based upon ease of use of the system, the polysemous icons or symbols utilized, and the easily memorized symbol sequence combinations, such a system became ideal for many mentally and physically challenged users for whom spelling and typing, as well as speech itself, was extremely difficult.

The system of the Baker '916 patent allowed for an operator to go directly from thought to speech. This was possible because each key of the keyboard bore a central image or symbol which was polysemous and illustrated an important aspect of life and/or linguistic function. The keyboards could be varied depending on the intellectual level of the intended operator. Therefore, each keyboard could in itself be a language which was designed for or with a specific user.

Each of the polysemous symbols was developed to be rich in associations so that combinations of symbols could signal sentence or message ideas in the operator's memory. This enabled the generation of plural word or whole sentence messages by the activation of only a limited number of keys. The device allowed for the generation of many sentences or phrases and a large core vocabulary which could be easily retrieved from memory because of the ease with which the polysemous symbols on the keys portrayed the production of whole thoughts.

Although many people have learned to successfully use augmentative and alternative communication systems containing embodiments of the semantic compaction encoding techniques to communicate with very high levels of linguistic performance, some populations of children have had difficulty learning more advanced systems where the available language is effectively unlimited. Children with autism, in particular, may be overwhelmed by a large array of unfamiliar polysemous symbols and potential polysemous symbol sequences. Alternatively, they may perseverate on one symbol while a clinician is trying to provide structured instructional activities involving sequences associated with a different polysemous symbol.

The Baker '916 patent provided for embodiments that include a keyboard with a relatively large number of polysemous symbols suitable for individuals with relatively high cognitive and linguistic skills, and embodiments that included a keyboard with a relatively small number of polysemous symbols suitable for individuals with more significant cognitive, physical or linguistic impairments. An individual who has difficulty learning the system may benefit from a variety of structured self-paced instructional activities, which may help him/her learn foundational skills needed for accessing linguistic content in a polysemous symbol-based AAC system when the linguistic content of the system is organized into a rule-based linguistic architecture and similar patterns of polysemous symbol sequences may be used to produce groups of similar words with similar grammatical functions or parts of speech.

Previous embodiments of the Baker '916 patent and all subsequent patents have incorporated a plurality of polysemous symbols that were rich with association, and could be used sequentially to produce a plurality of previously stored messages using various polysemous symbol sequences. The association between a polysemous symbol sequence and a corresponding previously stored message often was not immediately obvious to an inexperienced operator learning to use a polysemous symbol system for communication, or to that person's instructor. Experienced operators have often needed to give explanations of the associations between polysemous symbol sequences and corresponding previously stored messages have often been required in instructional and clinical settings. Rationales to explain these associations have been provided in printed (hard copy) manuals that service providers could access who were teaching an inexperienced operator to use a polysemous symbol system for communication. Such hard-copy manuals can provide critical reference material for non-disabled service providers in instructional and clinical settings.

SUMMARY

The inventors have discovered that there is a need for a systematic self-paced learning tool useful for teaching foundational skills needed for accessing linguistic content in a polysemous symbol-based AAC system when the linguistic content of the system is organized into a rule-based linguistic architecture and similar patterns of polysemous symbol sequences may be used to produce groups of similar words with similar grammatical functions or parts of speech, including patterns of polysemous symbol sequences that may be associated with groups of words with similar grammatical functions or parts of speech and rationales for explaining the association between a polysemous symbol sequence and a corresponding previously stored message of at least one of a word, sentence, phoneme, message, letter, number, morpheme, command and phrase.

In at least one embodiment, the method comprises: providing polysemous symbols for selection on an initial electronic screen overlay displayed on a display; storing, in a memory, a plurality of the selectable polysemous symbols in association with a pointer identifying display of an electronic screen overlay which is different from the initial electronic screen overlay; displaying a second electronic screen overlay on the display, in response to an initial selection of one of the provided polysemous symbols, the second electronic screen overlay being the electronic screen overlay associated with the selected polysemous symbol; storing, in the memory, a plurality of visual scenes, each respective one of the plurality of visual scenes being stored in association with at least two symbol sequences beginning with the initially selected polysemous symbol; and displaying one of the plurality of visual scenes on the display, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

In at least one embodiment of the method, the second electronic screen overlay may be displayed in place of the initial electronic screen overlay; the plurality of visual scenes may each respectively relate each of a corresponding two or more symbol sequences to an associated stored at least one word, sentence, phoneme, message, letter, number, morpheme, command and phrase; and/or the plurality of visual scenes each respectively relate each of a corresponding two or more symbol sequences to an associated stored at least one word, sentence, phoneme, message, letter, number, morpheme, command and phrase. In at least one embodiment of the method, the visual scene may include a graphic illustration of a relationship between each of the respective at least two symbol sequences and the at least one respective associated word, sentence, phoneme, message, letter, number, morpheme, command and phrase. In at least one embodiment of the method, the graphic illustration may be usable to explain a rationale between each of the at least two symbol sequences and the at least one respective associated word, sentence, phoneme, message, letter, number, morpheme, command and phrase.

In at least one embodiment, the computer readable medium includes program segments for, when executed on computer system, causing the computer system to implement the method of at least one embodiment.

In at least one embodiment, the apparatus comprises: an integrated input and display device configured to provide polysemous symbols for selection on an initial electronic screen overlay displayed on a display; a memory to store a plurality of the selectable polysemous symbols in association with a pointer identifying display of an electronic screen overlay which is different from the initial electronic screen overlay; and a processor configured to control display of a second electronic screen overlay on the integrated input and display device, in response to an initial selection of one of the provided polysemous symbols, the second electronic screen overlay being the electronic screen overlay associated with the selected polysemous symbol, the memory being further configured to store a plurality of visual scenes, each respective one of the plurality of visual scenes being stored in association with at least two symbol sequences beginning with the initially selected polysemous symbol, and configured to control display of one of the plurality of visual scenes on the integrated input and display device, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

In at least one embodiment of the apparatus, the second electronic screen overlay may be displayed in place of the initial electronic screen overlay; the plurality of visual scenes may each respectively relate each of a corresponding two or more symbol sequences to an associated stored at least one word, sentence, phoneme, message, letter, number, morpheme, command and phrase; and/or the plurality of visual scenes each respectively relate each of a corresponding two or more symbol sequences to an associated stored at least one word, sentence, phoneme, message, letter, number, morpheme, command and phrase. In at least one embodiment of the apparatus, the visual scene may include a graphic illustration of a relationship between each of the respective at least two symbol sequences and the at least one respective associated word, sentence, phoneme, message, letter, number, morpheme, command and phrase. In at least one embodiment of the apparatus, the graphic illustration may be usable to explain a rationale between each of the at least two symbol sequences and the at least one respective associated word, sentence, phoneme, message, letter, number, morpheme, command and phrase.

BRIEF DESCRIPTION OF THE DRAWINGS

FIG. 6 illustrates example embodiments of a dictionary with rationales corresponding to each of a plurality of polysemous symbol sequences.

Figure 1:
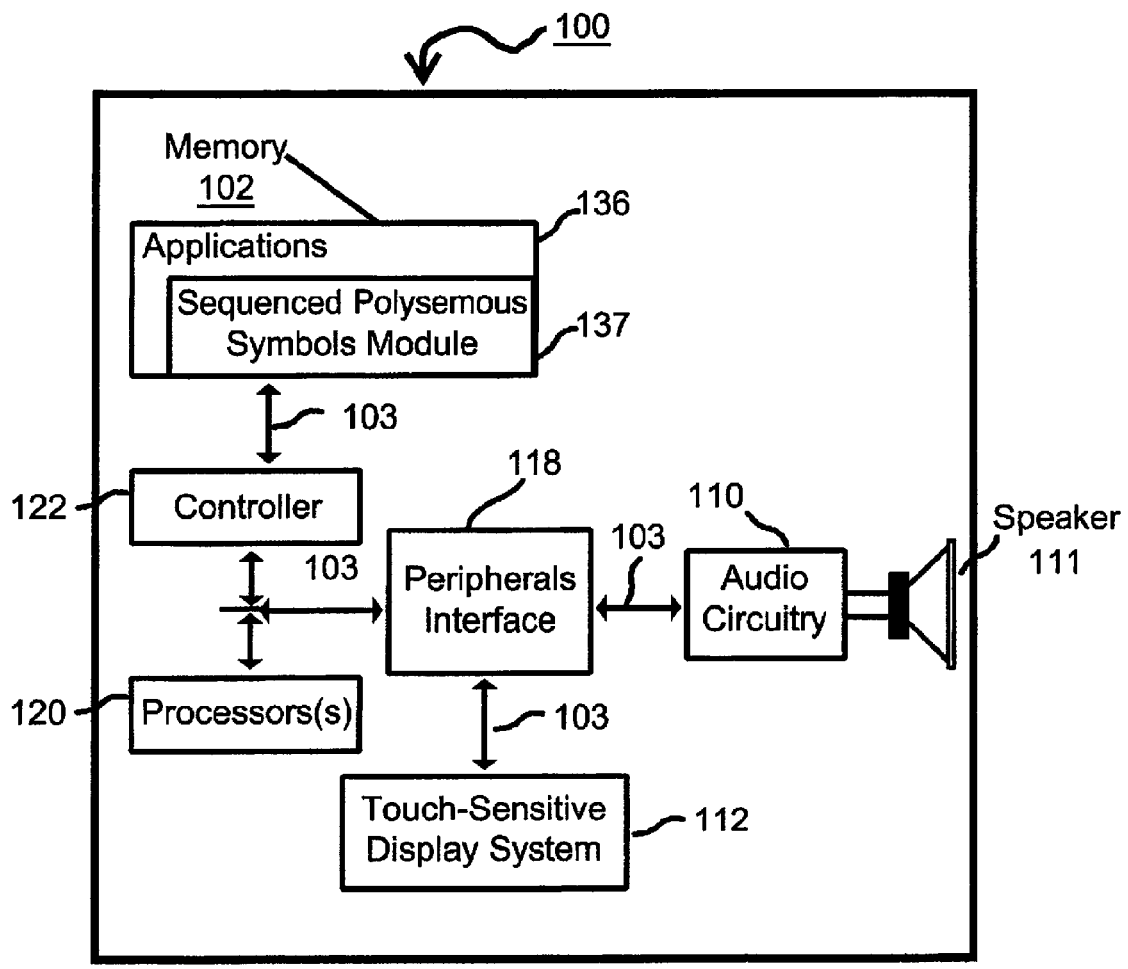
FIG. 1 is a block diagram illustrating components of an example portable multifunction device with a touch-sensitive display.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods. Although the processes describe the operations as sequential processes, many of the operations may be performed in parallel, concurrently or simultaneously. In addition, the order of operations may be re-arranged. The processes may be terminated when their operations are completed, but may also have additional steps not included. The processes may correspond to methods, functions, procedures, subroutines, subprograms, etc.

Methods discussed below may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Embodiments of a portable multifunction device, user interfaces for such devices, and associated processes for using such devices are described herein. In some embodiments, the portable multifunction device is a portable communications device such as a mobile telephone that also contains other functions, such as PDA and/or music player functions. It should be noted that the portable multifunction device described hereafter is an example of a device capable of performing the methodology provided in the present application and discussed in detail hereafter, and that the methodologies of the embodiments of the present application can be performed on the hereafter discussed portable multifunction device, but are not necessarily limited thereto.

The portable multifunction device may support a variety of application programs or applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the portable multifunction device may use at least one common physical user-interface device, such as the touch screen. One or more functions of the touch screen as well as corresponding information displayed on the portable multifunction device may be adjusted and/or varied from one application to the next and/or within a respective application. In this way, a common physical architecture (such as the touch screen) of the portable multifunction device may support the variety of applications with user interfaces that are intuitive and transparent.

The user interfaces may include one or more soft keyboard embodiments. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

FIG. 1 is a block diagram illustrating an example embodiment of a portable multifunction device 100 with a touch-sensitive display 112. The touch-sensitive display 112 is sometimes referred to herein as a "touch screen", "touch panel" "integrated input and display device", or "display system 112" for convenience. The portable multifunction device 100 may include a memory 102 (which may include one or more computer readable storage mediums for example), a memory controller 122, one or more computer processing units (CPU's, sometimes referred to herein as a "processor" or "controller" for convenience) 120. These components may communicate over one or more communication buses or signal lines 103.

It should be appreciated that the portable multifunction device 100 is only one example of a portable multifunction device, and that the portable multifunction device supporting various embodiments of the present application described hereafter may have more or fewer components than shown, may combine two or more components, or a may have a different configuration or arrangement of the components, etc.

The touch-sensitive display system 112 provides an input interface and an output interface between the portable multifunction device 100 and a user (hence the previous reference to integrated input and display device). The touch-sensitive display system 112 displays visual output to the user. The visual output may include for example, graphics, text, icons, video, and any combination thereof (collectively termed "graphics"). Additional outputs can be that of, for example, a printer (not shown), an audible output via a speaker 111 and audio circuitry 110, and/or other output devices. Peripheral interfaces 118 can be included between the processor(s) 120/controller 122 and the output devices (touch-sensitive display system 112, and audio circuitry 110/speaker 111).

The touch screen in the touch-sensitive display system 112 may use LCD (liquid crystal display) technology, or LPD (light emitting polymer display) technology, although other display technologies may be used in the embodiments of the invention as well, and is not limited as such.

In some embodiments, in addition to the touch screen in the touch-sensitive display system 112, the portable multifunction device 100 may include a touchpad (not shown) for activating or deactivating particular functions. In some embodiments, the touchpad may be a touch-sensitive area of the device that, unlike the touch screen, does not display visual output. The touchpad may be a touch-sensitive surface that is separate from the touch screen in the display system 112 or an extension of the touch-sensitive surface formed by the touch screen. Further, other types of known input devices (keyboard, mouse, microphone, etc.) and/or output devices (speaker, printer, etc.) may also be integrated therein/connected thereto.

Application programs 136 of embodiments of the present application, including those utilizing sequenced polysemous symbols to access messages (sequenced polysemous symbols module 137), can also be stored in memory 102. Such application programs 136 of various embodiments of the present application, as will be discussed hereafter can be implemented on the portable multifunction device 100 and/or can implement the methods discussed above and hereafter.

Figure 2:
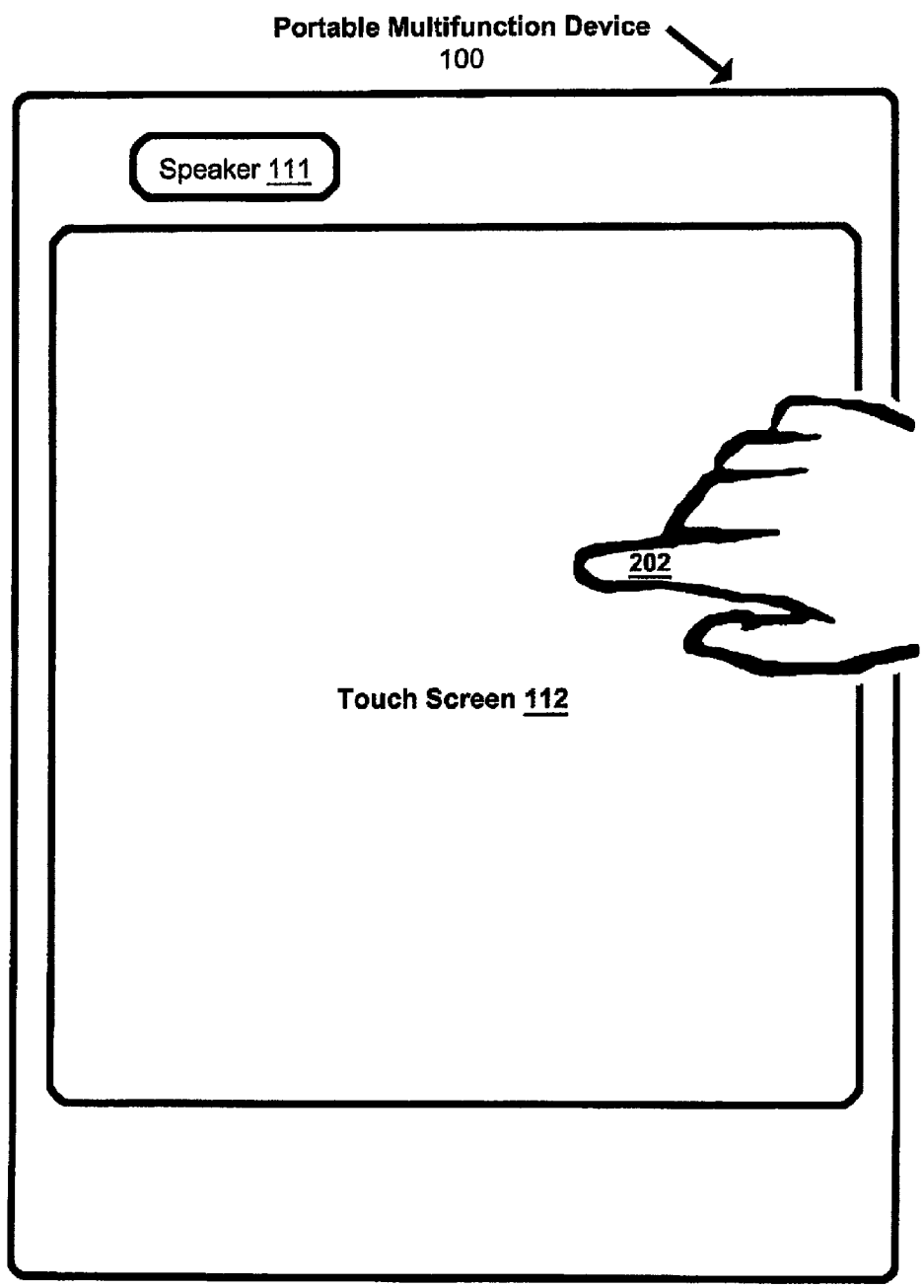
FIG. 2 illustrates an example portable multifunction device having a touch sensitive display.

FIG. 2 illustrates a portable multifunction device 100 having a touch screen 112 in accordance with some embodiments. The touch screen 112 may display one or more graphics. These graphics can include symbols, icons, text, a virtual keyboard with virtual keys, etc., such as those described in the embodiments hereafter. In an embodiment, as well as others described below, a user may select one or more of the graphics by making contact or touching the graphics, for example, with one or more fingers 202 (not drawn to scale in the figure).

It should be noted that the apparatus described above with reference to FIGS. 1 and 2 references a general description of hardware for an apparatus described hereafter regarding embodiments of the present application, as well as a general description of hardware for an apparatus to implement the methods and programs described below regarding embodiments of the invention.

Application programs of embodiments of the present application described hereafter, utilizing sequenced polysemous symbols to access stored messages, can also be stored in memory 102. Such application programs of various embodiments of the present application as will be discussed hereafter can be implemented on the portable multifunction device 100 discussed above.

At least one embodiment of the present invention is directed towards an application program utilizing a plurality of interactive visual scenes designed for teaching foundational skills needed to access stored messages using sequenced polysemous symbols, on tablet devices such as the portable multifunction device 100 including but not limited to iPADs and Android devices, for example, as well as other computer devices with at least one processor 120, memory 102, integrated input and display device or touch screen display 112, etc. Thus, it should be noted that while hardware relating to the portable multifunction device 100 is described above for implementing the application programs of embodiments of the present application described hereafter in an example manner, the embodiments of the present application are not limited to the portable multifunction device 100 described above and can be implemented on various portable and non-portable computer devices including at least one processor, memory, integrated input and display device, etc.

For example, at least one embodiment of the present invention is directed towards an application program utilizing a plurality of interactive visual scenes designed for teaching foundational skills needed to access stored messages using sequenced polysemous symbols on smaller portable smart phone devices such as iPhone devices, for example.

At least one embodiment of the present invention is directed towards an apparatus, computer readable medium, method, article of manufacture and/or an application program utilizing a plurality of interactive visual scenes designed for teaching foundational skills needed to access stored messages using sequenced polysemous symbols on computer devices with touch screen interfaces, as well as other computer devices with at least one processor, memory, touch screen interface, etc.

Figure 3:
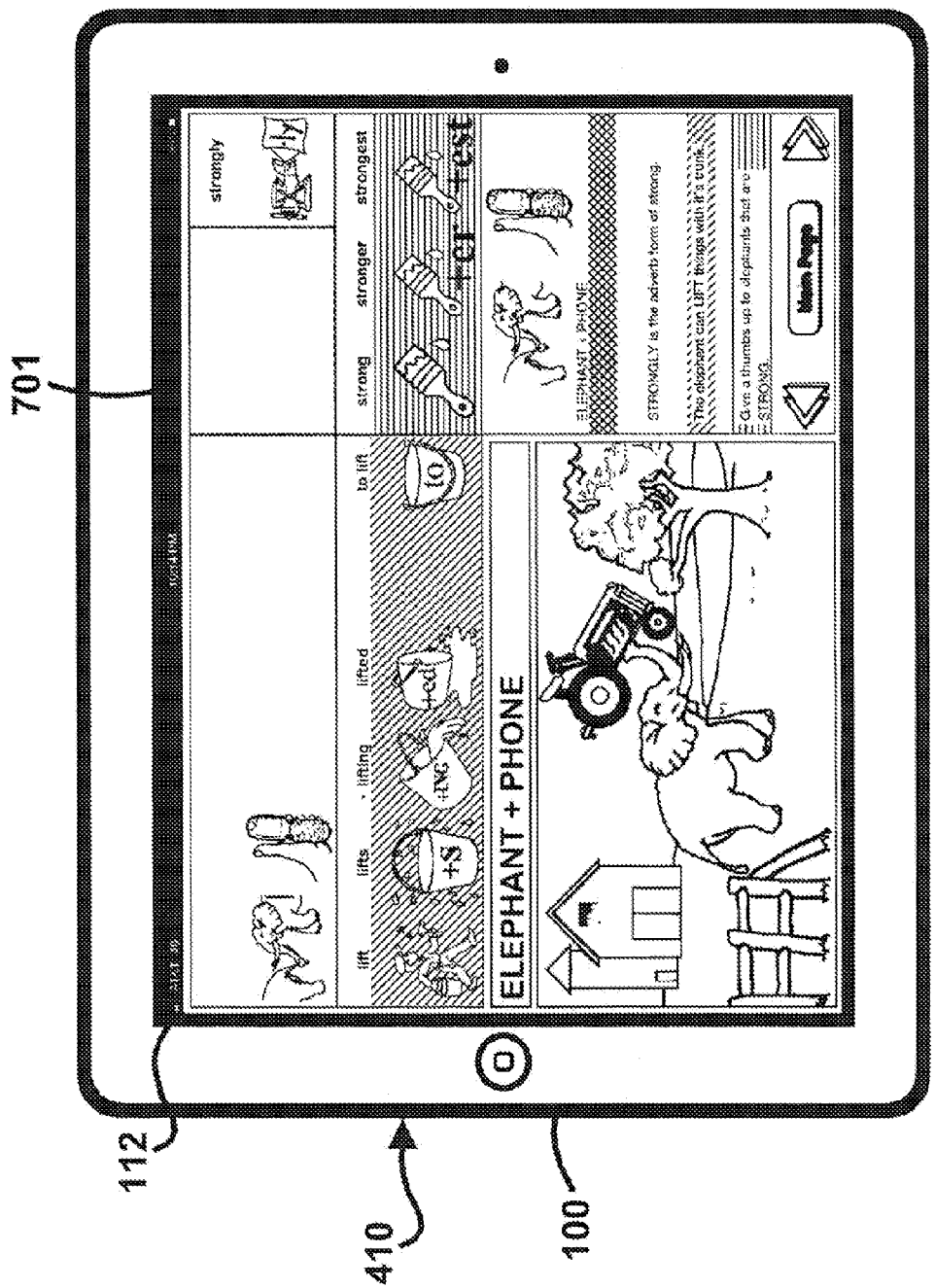
FIG. 3 illustrates an example embodiment of the application program of an embodiment of the present invention running on a portable multifunction device which is a tablet type consumer computer device, including a touch sensitive display.

FIG. 3 illustrates an example embodiment of the application program of an example embodiment of the present invention running on a portable multifunction device 100 which is a tablet type consumer computer device 410, including a touch sensitive display 112. The touch sensitive display 112 includes an embodiment of interactive visual scene overlay 701. Again, the illustrated structure of FIG. 3 is that of an example embodiment and the embodiments of the present application should not be limited to such a portable multifunction device 100, or even to portable devices.

Figure 4:
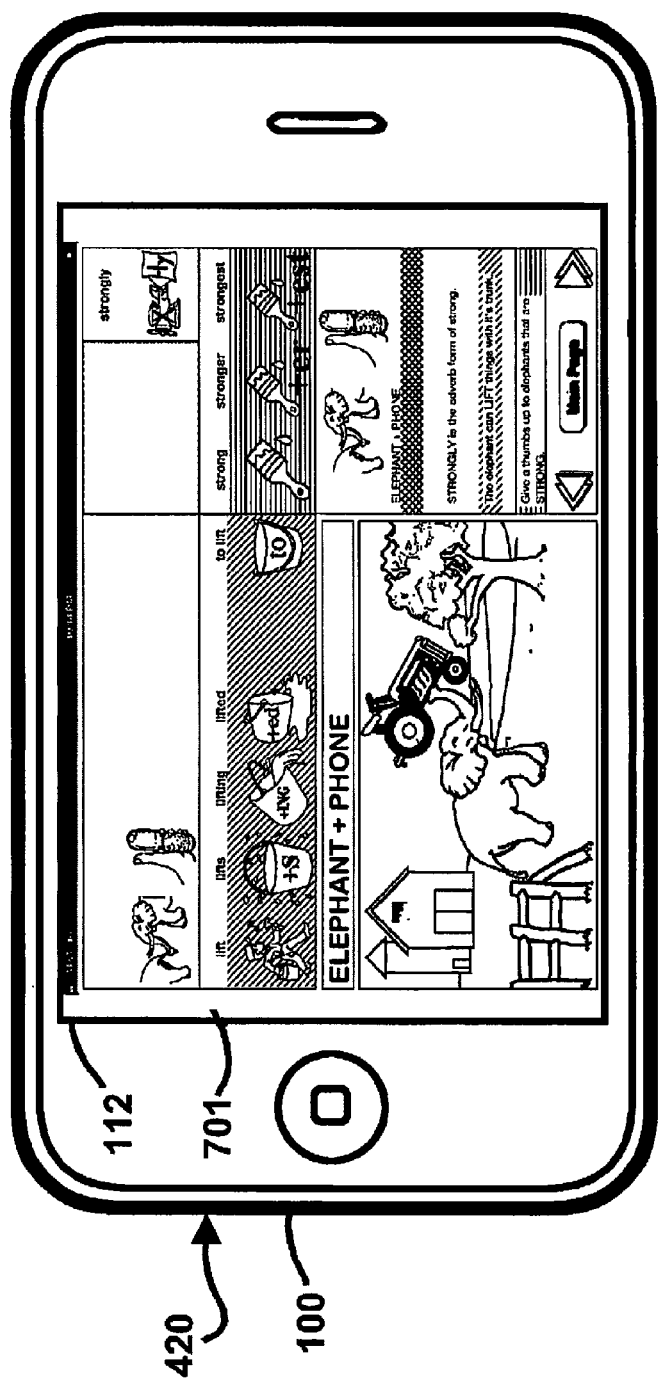
FIG. 4 illustrates an example embodiment of the application program of an embodiment of the present invention running on a portable multifunction device which is a smart phone type consumer computer device, including a touch sensitive display.

FIG. 4 illustrates an example embodiment of the application program of an example embodiment of the present invention running on a portable multifunction device 100 which is a smart phone type consumer device 410, including a touch sensitive display 112. The touch sensitive display 112 includes an embodiment of interactive visual scene overlay 701. Again, the illustrated structure of FIG. 4 is that of an example embodiment and the embodiments of the present application should not be limited to such a portable multifunction device 100, or even to portable devices.

Note that FIGS. 3 and 4 are merely non-limiting examples of portable multifunction devices 100 including a graphical touch sensitive display 112 which are encompassed by the embodiments of the present application, used to illustrate a relationship between interactive visual scene overlay 701 and the portable multifunction devices 100 including a graphical touch sensitive display 112. It should be understood that the embodiments of the present application are applicable to any portable or even semi or non-portable multifunction devices including a graphical touch sensitive display capable of displaying electronic screen overlays such as those shown in FIGS. 3 and 4.

Embodiments of a sequenced polysemous symbol system using sequentially linked electronic screen overlays are described herein in such a way that the linguistic content of the system may be organized into a rule-based linguistic architecture and similar patterns of polysemous symbol sequences may be used to produce groups of similar words with similar grammatical functions or parts of speech, including patterns of polysemous symbol sequences that may be associated with groups of words with similar grammatical functions or parts of speech and rationales for explaining the association between a polysemous symbol sequence and a corresponding previously stored message of at least one of a word, sentence, phoneme, message, letter, number, morpheme, command and phrase; and the plurality of interactive visual scene overlays disclosed herein may be used to support the learning of an inexperienced operator who is learning to use a plurality of polysemous symbol sequences for communication. These embodiments are non-limiting, in that other sequenced polysemous symbol systems that do not utilize sequentially linked electronic screen overlays may also be organized into a rule-based linguistic architecture as described, and the plurality of interactive visual scene overlays disclosed herein may also support the learning of individuals using such other sequenced polysemous symbol systems.

At least one embodiment of the present invention includes a plurality of linked electronic screen overlays, each of which displays a virtual keyboard with a plurality of virtual key locations that may include a symbol, such as a relatively centrally disposed symbol for example.

At least one embodiment of the present invention includes a plurality of linked electronic screen overlays, each of which displays a virtual keyboard, as described above, where a configuration of the virtual key locations of the virtual keyboard may be held constant across the plurality of electronic screen overlays.

At least one embodiment of the present invention includes a plurality of linked electronic screen overlays, as described above, all of which may occupy the same region of space on a graphic display when they are displayed so that only one overlay may be displayed for the operator at any given moment.

At least one embodiment of the present invention includes an apparatus, method, computer readable medium and/or article of manufacture displaying a plurality of polysemous symbols, each of which may be relatively centrally disposed on at least one location of the virtual keyboard of a subset of one or more of a plurality of linked electronic screen overlays, as described above.

At least one embodiment of the present invention includes an apparatus method, computer readable medium and/or article of manufacture displaying a plurality of virtual key locations, as described above, each of which may include a corresponding polysemous symbol and a corresponding embedded link to retrieve and display an electronic screen overlay that differs from the electronic screen overlay that is currently displayed for the operator. As such, the electronic screen overlay that is displayed for the operator may change when a key location including a polysemous symbol and an embedded link is triggered or selected. Although key locations and/or polysemous symbols may be included on a plurality of linked electronic screen overlays, the embedded link that corresponds to a key location and/or symbol on one electronic screen overlay may be unique and differ from an embedded link that corresponds to the same key location and/or symbol on other electronic screen overlays. Note that the same symbol can be included on multiple electronic screen overlays and may exist at the same key location, for example.

At least one embodiment of the present invention provides an apparatus, method, computer readable medium and/or article of manufacture including a plurality of polysemous symbols, each of which may be relatively centrally disposed on a location of the virtual keyboard of at least one of a plurality of linked electronic screen overlays, and which may produce the speech and/or text output of a corresponding previously stored message when triggered. Although each polysemous symbol may be included on a plurality of linked electronic screen overlays, the previously stored message that corresponds to a symbol on one electronic screen overlay (when sequenced with other symbols) may be unique and differ from the previously stored message that corresponds to the same symbol on other electronic screen overlays (when sequenced with other symbols). Note that the same symbol can be included on multiple electronic screen overlays and may exist at the same key location, for example.

In at least one embodiment of an apparatus, method, computer readable medium and/or article of manufacture of the present invention, an operator may trigger, via selection thereof, a sequence of two polysemous symbols that are located on two sequentially displayed linked electronic screen overlays to produce a speech or text output of a previously stored message using the following process, for example.

Figure 5A:
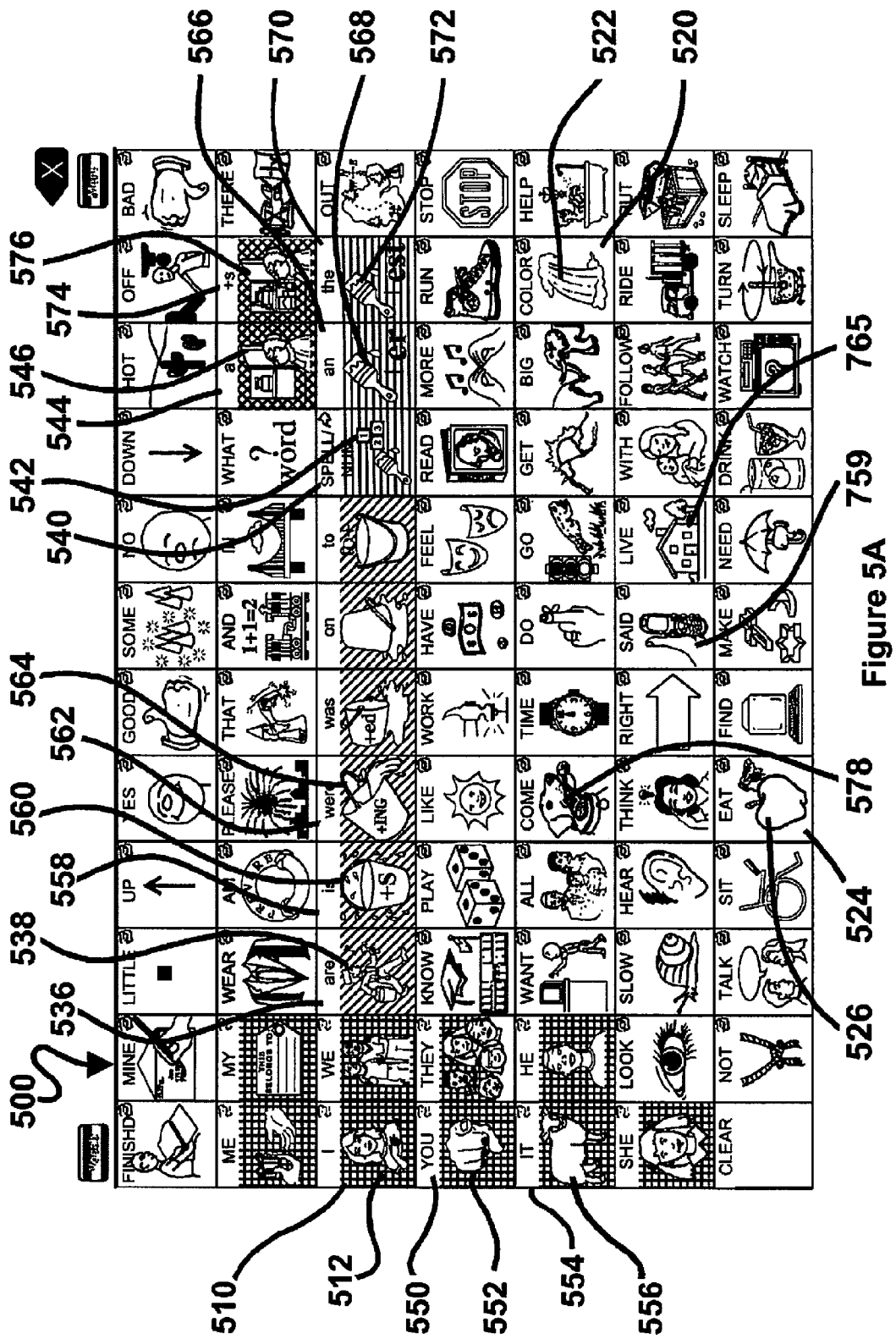
FIGS. 5 A-C illustrate example embodiments of electronic screen overlays.

An initial electronic screen overlay 500, such as that shown in FIG. 5A for example, is shown on the touch sensitive display 112 of the portable multifunction device 100; the initial electronic screen overlay 500 including a grid of symbols for example, stored in a database in memory 102 for example, and visually displayed to the user on an LCD display, for example, of the touch sensitive display 112. The initial electronic screen overlay 500 may be referred to as the 'CORE HOME overlay,' for example.

Polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

The aforementioned may occur, for example, by the processor 120 receiving an indication of user selection by determining the XY position of the activation on the touch sensitive display 112 to identify the position of the initially selected polysemous symbol within the CORE HOME overlay. This selected polysemous symbol may be one of a plurality of selectable polysemous symbols of the 'CORE HOME overlay' stored in association with, and marked in the database in memory 102 for example, a pointer to a second level electronic screen overlay. In response to the processor 120 determining selection of the initially selected polysemous symbol, the processor 120 may then control the touch sensitive display 112 to display the second level electronic screen overlay indicated by the pointer, the second level electronic screen overlay being the electronic screen overlay associated via a pointer with the selected polysemous symbol and being different from the initial electronic screen overlay or 'CORE HOME overlay'. The contents of this second level electronic screen overlay can further be directed by the processor 120 to replace the content of the CORE HOME overlay on the touch sensitive display 112 from which the initial polysemous symbol was selected.

Thereafter, the processor 120 may receive an indication of selection of a terminal (final) polysemous symbol of a sequence, from the currently displayed second level electronic screen overlay for example (via selection using a touch panel key or some other form of input, for example), as described above, where the selected final polysemous symbol triggers (upon the processor 120, for example, receiving an indication of selection of a key location corresponding to the terminal symbol) output of a previously stored message (word, phrase, morpheme or message) corresponding to the symbol sequence including the selected first and terminal symbols (displayed on touch sensitive display 112, output via a speaker, etc.). Thus, a polysemous symbol on the second level electronic screen overlay can serve as a terminal symbol. In this case, detection of selection of the symbol, through that described above, may cause the processor 120 to access a message (word, phrase, morpheme, message, etc.) stored in memory 102 and linked in the database to a symbol sequence including the initially selected symbol and the selected symbol provided on the displayed second electronic screen overlay. The message may contain a text string which can be shown on the LCD display of the touch sensitive display 120, spoken via a speech synthesizer, printed, etc., or otherwise output.

Selection of the terminal polysemous symbol of the two symbol sequence that is on the second level electronic screen overlay may further trigger display of the first level electronic screen overlay or 'CORE HOME overlay' (in place of the second level electronic screen overlay for example and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid two symbol sequence. In addition to acting upon linked text string as described above, the selection of a terminal symbol may also trigger the contents of the second level electronic screen display to be replaced by the contents of the CORE HOME overlay.

In at least one embodiment of an apparatus, method, computer readable medium and/or article of manufacture of the present invention, an operator may trigger a sequence of three polysemous symbols that are located on three sequentially displayed linked electronic screen overlays to produce a speech or text output of a previously stored message using the following process, for example.

Polysemous symbols are initially provided for selection on the initial electronic screen overlay 500 or 'CORE HOME overlay', displayed with symbols for selection on touch sensitive display 112, for example. Thereafter, triggering of an initial polysemous symbol of the sequence on the initial or first level electronic screen overlay then may begin upon user selection (via selection using a touch panel key or other form of input, for example on the touch sensitive display 112), as described above, where the initially selected polysemous symbol may include an embedded link to retrieve (upon the processor 120, for example, receiving an indication of selection of a key location corresponding to the symbol) and trigger display of a second level electronic screen overlay (the display being displayed on touch sensitive display 112, for example, in place of the first level electronic screen overlay, for example).

It can further include triggering an intermediate polysemous symbol of the same sequence (via selection of, and detection of selection by processor 120, a symbol of the displayed second level electronic screen overlay using a touch panel key or some other form of input on touch sensitive display 112, for example), as described above, where the selected intermediate polysemous symbol includes a corresponding embedded link stored in memory 102 and retrievable via processor 120 to trigger the processor 120 to control display of a third level electronic screen overlay on touch sensitive display 112. The aforementioned may be achieved by an initial electronic screen overlay being shown on the visual display of the touch sensitive display system 112; an electronic screen overlay being a grid of symbols, stored in a database in the memory 102 and visually displayed to the user on an LCD display of the touch sensitive display system 112, for example. The initial electronic screen overlay will be referred to as the 'CORE HOME overlay.'

Symbol activation may be detected by the processor 120 on the touchscreen of the touch sensitive display 112 or alternative input device. The processor 120 may then determine the XY position of the activation to identify the initial polysemous symbol within the CORE HOME overlay. This polysemous symbol may be marked in the database in memory 102 with a pointer to a second level electronic screen overlay. The contents of this second level electronic screen overlay may then be controlled by processor 120 to replace the content of the CORE HOME overlay from which the initial polysemous symbol was selected.

A second polysemous symbol can then be selected from the symbols of the second electronic screen overlay. Again, the processor 120 receives an indication of and determines the XY position of the activation to identify the second selected polysemous symbol within the second level electronic screen overlay. This polysemous symbol may be one marked in the database in memory 102 with a pointer to a third level electronic screen overlay. In response to the processor 120 determining selection of the second selected polysemous symbol, the processor 120 may then control the touch sensitive display 112 to display the third level electronic screen overlay indicated by the pointer, the third level electronic screen overlay being the electronic screen overlay associated via a pointer with the second selected polysemous symbol and being different from the second electronic screen overlay. The contents of this third level electronic screen overlay may replace the content of the second level electronic screen overlay from which the second polysemous symbol was selected.

Selection of a the terminal polysemous symbol of the sequence may then occur on the currently displayed third level electronic screen overlay (via selection using a touch panel key or some other form of input, for example), as described above, where the final polysemous symbol triggers (upon a processor, 120 for example, receiving an indication of detection of a key location corresponding to the terminal symbol) output of a previously stored message (word, phrase, morpheme or message) corresponding to the symbol sequence including the selected first, second and terminal symbols (displayed on touch sensitive display 112, output via a speaker, etc.).

Thus, as described above, a polysemous symbol on the second level or third level electronic screen display can serve as a terminal symbol. In this case, detection of selection of the symbol, through that described above, may cause the processor 120 to access a message (word, phrase, morpheme or message) stored in memory 102 and linked in the database to a symbol sequence including the initially selected symbol, and the selected symbol provided on the displayed electronic screen overlay (and potentially an intermediate symbol as well). The message may contain a text string which can be shown on the LCD display of the touch sensitive display 120, spoken via a speech synthesizer, printed, etc., or otherwise output.

Selection of the terminal polysemous symbol of the three symbol sequence that is on the third level electronic screen overlay (or similarly the second level electronic screen overlay in a two symbol sequence) may further trigger display of the first level electronic screen overlay or 'CORE HOME overlay' (in place of the third level electronic screen overlay for example, or similarly the second level electronic screen overlay in a two symbol sequence) and in addition to the outputting of the stored message, e.g. subsequent thereto or simultaneous therewith). This may occur subsequent to the symbol being selected so that the operator may thereafter begin executing a new function, such as selection of a next sequence of polysemous symbols, for example. This automatic function may allow the system to act as a continuous input device that does not require additional keystrokes to return to the first level electronic screen overlay after completion of a valid three symbol sequence. In addition to acting upon linked text string as described above, the selection of a terminal symbol may also trigger the contents of the second level or third level electronic screen display to be replaced by the contents of the CORE HOME overlay. Again, similar to that discussed previously, this can occur via storage of an embedded link in association with the terminal symbol in the database of memory 102 for example.

Note that all key locations on the any level electronic screen overlay need not correspond solely to symbols including an embedded link, let alone polysemous symbols including an embedded link. Note also that key locations corresponding to a symbol including an embedded link on any level electronic screen overlay may be differentiated from key locations corresponding to a symbol which does not include an embedded link, by including a common additional symbol for all key locations corresponding to symbols which include an embedded link, for example (and/or in any other way, such as by including differentiated lettering on the corresponding key location, for example).

At least one embodiment of the present invention includes an apparatus, method, computer readable medium and/or article of manufacture including a plurality of linked electronic screen overlays, as described above, where the virtual keys of the virtual keyboard on each electronic screen overlay may include one of a plurality of polysemous symbols, as described above, wherein the included corresponding polysemous symbols may vary across the plurality of electronic screen overlays, and may exist at the same key location, for example.

At least one embodiment of the present invention includes an apparatus, method, computer readable medium and/or article of manufacture including a plurality of linked electronic screen overlays, as described above, where a given polysemous symbol may be relatively centrally disposed on one or more locations of the virtual keyboard of one or more of the plurality of linked electronic screen overlays, and where the given polysemous symbol may be relatively centrally disposed in the same one or more locations on the virtual keyboards of all linked electronic screen overlays that include the symbol. In this way, the key locations of the given polysemous symbol may be held constant across the whole plurality of linked electronic screen overlays.

At least one embodiment of the present invention includes an apparatus, method, computer readable medium and/or article of manufacture including a plurality of polysemous symbols, as described above, each of which may be included on the virtual keyboards of a subset of a plurality of linked electronic screen overlays, as described above, where the key locations of each of the plurality of polysemous symbols may be held constant across the whole plurality of linked electronic screen overlays.

At least one embodiment of the present invention includes an apparatus, method, computer readable medium and/or article of manufacture including a first level electronic screen overlay or CORE HOME overlay, which may include all of a plurality of polysemous symbols, as described above.

At least one embodiment of the present invention includes an apparatus, method, computer readable medium and/or article of manufacture including a first level electronic screen overlay or CORE HOME overlay, which may include all of a plurality of polysemous symbols, as described above, where at least one of these polysemous symbols may include an embedded link to a second level electronic screen overlay.

At least one embodiment of the present invention includes an apparatus, method, computer readable medium and/or article of manufacture including a first level electronic screen overlay or CORE HOME overlay, which may include a plurality of polysemous symbols, as described above, and a plurality of symbols which, when triggering or activation is detected, can trigger production of a speech and/or text output of a corresponding previously stored message. Each of these symbols that may be triggered or activated to trigger production of a speech and/or text output of a corresponding previously stored message.

At least one embodiment of the present invention includes an apparatus, method, computer readable medium and/or article of manufacture including a plurality of second level electronic screen overlays, each of which may be accessed by triggering a link that is embeddedly connected or corresponded to a polysemous symbol and/or key location on the first level electronic screen overlay.

In at least one embodiment of the present invention, each second level electronic screen overlay can only be accessed by triggering or selecting one of the plurality of polysemous symbols on the first level electronic screen overlay.

At least one embodiment of the present invention includes an apparatus, method, computer readable medium and/or article of manufacture including a plurality of second level electronic screen overlays, as described above, each of which may include a subset of the plurality of polysemous symbols included on the first level electronic screen overlay.

At least one embodiment of the present invention includes an apparatus, method, computer readable medium and/or article of manufacture including at least one key location and/or symbol on each of at least one of a plurality of second level electronic screen overlays, as described above, that includes and/or corresponds to an embedded link to the first level electronic screen overlay to return the user to the first level electronic screen overlay or CORE HOME overlay.

At least one embodiment of the present invention includes an apparatus, method, computer readable medium and/or article of manufacture including a plurality of second level electronic screen overlays, as described above, each of which may include at least one polysemous symbol that can be selected and thus triggered to produce the speech and/or text output of a corresponding previously stored message and that includes an embedded link to the first level electronic screen overlay or CORE HOME overlay, as described above. As such, the user may be returned to the CORE HOME overlay as a function of a continuous input system that eliminates the extra keystrokes necessary to change screens. The at least one sequence of two polysemous symbols, including the previously selected polysemous symbol on the initial electronic screen overlay and a second polysemous symbol on the currently displayed second level linked electronic screen overlay that can be selected as described and thus triggered to produce the speech and/or text output of a corresponding previously stored message.

At least one embodiment of the present invention includes an apparatus, method, computer readable medium and/or article of manufacture including a plurality of second level electronic screen overlays, as described above, each of which may include at least one polysemous symbol that includes an embedded link to a third level electronic screen overlay.

In at least one embodiment of the present invention, each third level electronic screen overlay can only be accessed by triggering, via a processor receiving an indication of selection thereof, one of the one or more polysemous symbols on one of the plurality of second level electronic screen overlays. Given that a second level electronic screen overlay may only be accessed by triggering one of the plurality of polysemous symbols on the first level electronic screen overlay, there may be only one sequence of symbols on sequentially linked electronic screen overlays that can be used to access a specific third-level electronic screen overlay.

At least one embodiment of the present invention includes an apparatus, method, computer readable medium and/or article of manufacture including a plurality of third level electronic screen overlays, as described above, each of which may include a subset of one or more of a plurality of polysemous symbols.

At least one embodiment of the present invention includes at least one symbol on each of a plurality of third level electronic screen overlays, as described above, that includes an embedded link to the first level electronic screen overlay or CORE HOME overlay, as described above.

At least one embodiment of the present invention includes an apparatus, method, computer readable medium and/or article of manufacture including a plurality of third level electronic screen overlays, as described above, each of which may include at least one polysemous that can be triggered to produce the speech and/or text output of a corresponding previously stored message and includes an embedded link to the first level electronic screen overlay or CORE HOME overlay, as described above.

The at least one sequence of three symbols, including the previously selected polysemous symbol on the initial electronic screen overlay, the previously selected polysemous symbol on the previously displayed second level linked electronic screen overlay, and a polysemous symbol on the currently displayed third level linked electronic screen overlay that can be selected as described and thus triggered to produce the speech and/or text output of a corresponding previously stored message.

Figure 5B:
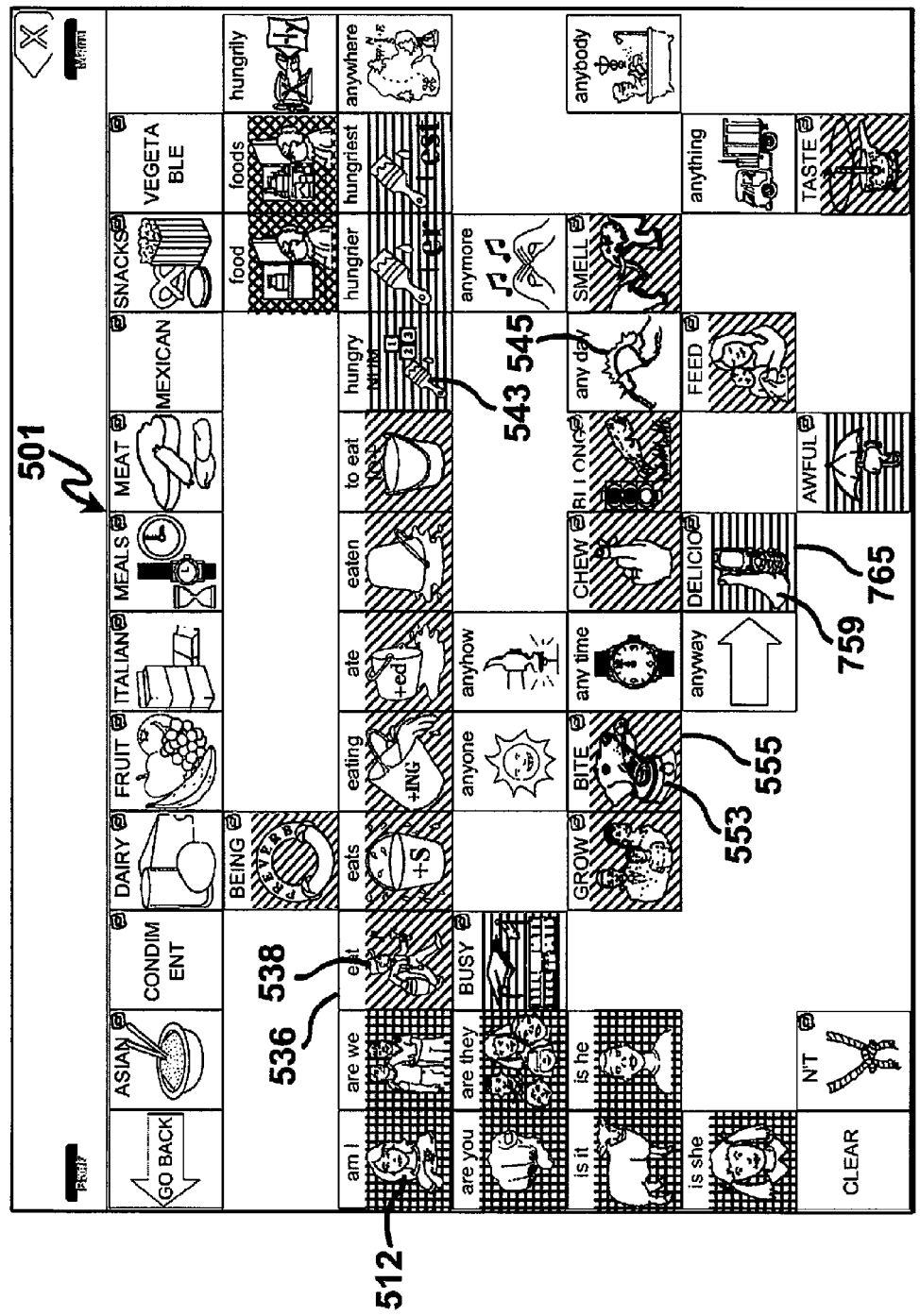
Figure 5C:
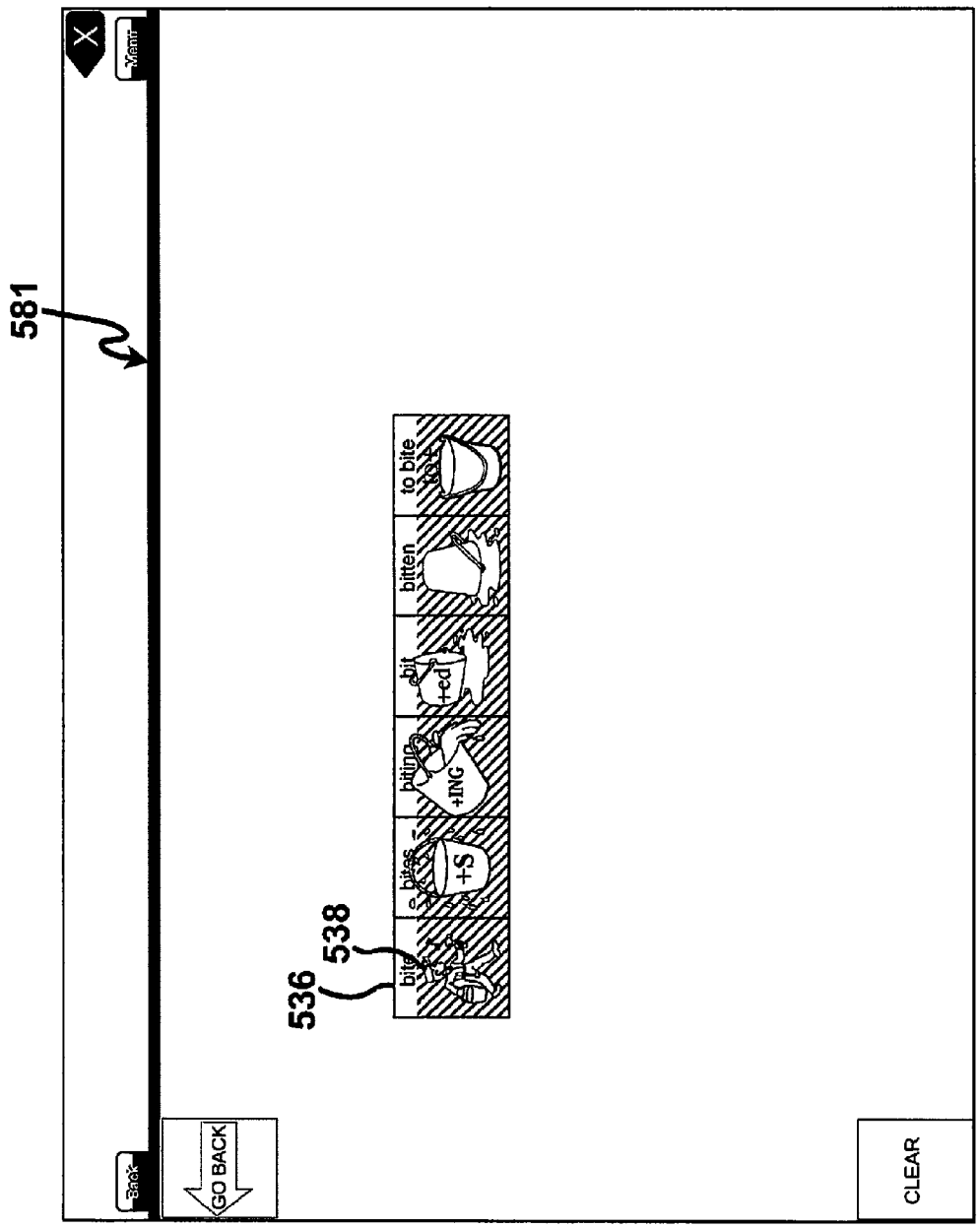

FIGS. 5A-C show a series of three sequentially linked electronic screen overlays for display on a touch sensitive display 112 of a portable multifunctional device 100 for example, from an embodiment of the present invention with 84 locations on the virtual keyboard on each of a plurality of linked electronic screen overlays. Each key location on each electronic screen overlay may include a relatively centrally disposed polysemous symbol. FIG. 5A is the first level electronic screen overlay 500. FIG. 5B is a second level electronic screen overlay 501, which may be retrieved and displayed when an operator triggers a key location or virtual key on the first level electronic screen overlay 500 of FIG. 5A that includes a polysemous symbol that functions as an initial symbol in a plurality of polysemous symbol sequences. FIG. 5C is a third level electronic screen overlay 581, which may be retrieved and displayed when an operator triggers a sequence of two symbols, including selection of a key on the first level electronic screen overlay 500 of FIG. 5A that includes a polysemous symbol that functions as an initial symbol in a plurality of polysemous symbol sequences, and including selection of a key on the second level electronic screen overlay 501 of FIG. 5B that includes a polysemous symbol that functions as an intermediate symbol in a plurality of polysemous symbol sequences.

FIG. 5A shows a first level or initial electronic screen overlay 500, named the "CORE HOME" overlay for example with an 84 key location virtual keyboard and a plurality of polysemous symbols associated with various virtual keys or key locations of the virtual keyboard. On the first level electronic screen overlay 500 of FIG. 5A, the key 510 corresponding to the polysemous "I" symbol 512 may be triggered as the initial symbol in a plurality of polysemous symbol sequences. When the "I" symbol 512 (associated with key 510 located in Row 3, Column 1 of the virtual keyboard first level electronic screen overlay 500 of FIG. 5A) is triggered, a second level electronic screen overlay 550 named the "I" overlay for example, may be retrieved and displayed, and the operator may trigger one of a plurality of keys corresponding to second polysemous symbols to continue producing one of a plurality of previously stored messages, such as "I," "me", "I am", or "I can."

When the key 520 corresponding to the RAINBOW symbol 522 (associated with key 520 located in Row 5, Column 11 of the virtual keyboard first level electronic screen overlay 500 of FIG. 5A) is triggered, a second level electronic screen overlay named the "RAINBOW" overlay for example may be retrieved and displayed, and the operator may trigger one of a plurality of second polysemous symbols to continue producing one of a plurality of previously stored messages, such as "color," "coloring," "pretty," "paint," "red," "blue," and "green."

When the key 524 corresponding to the APPLE symbol 526 (Row 7, Column 5 of the virtual keyboard first level electronic screen overlay 500 of FIG. 5A) is triggered, the second level electronic screen overlay, named the "APPLE" overlay for example may be retrieved and displayed, and the operator may trigger one of a plurality of second polysemous symbols to continue producing one of a plurality of previously stored messages, such as "eat," "ate," "bite," "hungry," "am I," or "anyone."

Each of a subset of less than all of the plurality of polysemous symbols include visual indicators that may help an operator determine the grammatical functions or parts of speech of a plurality of words, morphemes, phrases, or stored messages that may be produced using polysemous symbol sequences that include the symbol with the visual indicator. The background color of an individual key may be associated with a grammatical function or part of speech. For example, the virtual key 510 with the I symbol 512 (Row 3, Column 1), virtual key 550 with the YOU symbol 552 (Row 4, Column 1), and virtual key 554 with the IT symbol 556 (Row 5, Column 1) include symbols that may be used in polysemous symbol sequences to produce previously stored messages that include a personal pronoun, and may have a common color (yellow for example, each represented by checkered lines in FIG. 5A) background that is unique to polysemous symbols associated with personal pronouns. In another example, the virtual key 536 with the VERB symbol 538 (Row 3, Column 3), the virtual key 558 with the VERB+S symbol 560 (Row 3, Column 4), and the virtual key 562 with the VERB+ING symbol 564 (Row 3, Column 5) include symbols that may be used in polysemous symbol sequences to produce previously stored messages that include stem, past tense, and present progressive verb forms, and may have a common color (green for example, each represented by diagonal lines in FIG. 5A for example) background that is unique to polysemous symbols associated with one or more verbs. In another example, the virtual key 540 with the ADJECTIVE symbol 542 (Row 3, Column 9), the virtual key 566 with the ADJECTIVE+ER symbol 568 (Row 3, Column 10), and the virtual key 570 with the ADJECTIVE+EST symbol 572 (Row 3, Column 11)

symbols may be used in polysemous symbol sequences to produce positive, comparative, and superlative adjectives, and may have a common color (blue for example, represented by horizontal lines in FIG. 5A for example) background that is unique to polysemous symbols associated with one or more adjectives. In another example, the virtual key 544 with the NOUN symbol 546 (Row 2, Column 10) and the virtual key 574 with the NOUN+S symbol 576 (Row 2, Column 11) may be used in polysemous symbol sequences to produce singular and plural nouns, and may have a common color (orange for example, represent by x'd lines in FIG. 5A for example) background that is unique to polysemous symbols associated with one or more nouns. All of these symbols associated with grammatical functions or parts of speech may have similar visual color indicators on second or third level linked electronic overlays, as in FIGS. 5B and 5C.

FIG. 5B shows a second level linked electronic screen overlay 501 with an 84 location virtual keyboard similar to the 84 location virtual keyboard of the first level electronic screen overlay 500 in FIG. 5A. This overlay 501, named the "APPLE" overlay for example, may be retrieved and displayed when the APPLE symbol 526 on the first level linked electronic screen overlay 500 is triggered. Symbols on this overlay (which may be the same as those in the same key locations as FIG. 5A) may be selected as the second symbol in polysemous symbol sequences that begin with the APPLE symbol 526, which is triggered on the first level electronic screen overlay 500.

The I symbol 512 (Row 3, Column 1), VERB symbol 538 (Row 3, Column 3), ADJECTIVE symbol 543 (Row 3, Column 9), and MOUNTAIN symbol 545 (Row 5, Column 9) on the second level linked electronic screen overlay 501 in FIG. 5B may be triggered as the terminal symbol in sequences of two polysemous symbols beginning with the APPLE symbol 526. When a key corresponding to one of these symbols is triggered, the corresponding previously stored message (corresponding to the two symbol sequence) is produced and the first level linked electronic overlay 500 is retrieved and displayed once again.

The DOG symbol 553 on the second level linked electronic screen overlay 501 in FIG. 5B may be triggered as the intermediate symbol in at least one sequence of three polysemous symbols beginning with the APPLE 526 and DOG 553 symbols. When the key corresponding to this DOG symbol 553 is triggered, the third level linked electronic screen overlay 581 of FIG. 5C, named the "APPLE DOG" overlay for example, may be retrieved and displayed. The DOG symbol 553 on the second level linked electronic overlay 501 in FIG. 5B, may be used as an intermediate symbol in polysemous symbol sequences for producing different forms of the verb "bite," and may include visual indicators that may help an operator determine that it may be used as an intermediate symbol in polysemous symbol sequences for producing one or more verbs. In particular, the virtual key 555 corresponding to the DOG symbol 553 may now have a green background color that is the same as the green background color found on the key 536 corresponding to polysemous VERB symbol 538 (Row 3, Column 3) of FIGS. 5A, 5B, and 5C (see the diagonal lines indicating the common green color background of the keys 536, 538 and 562 of FIG. 5A and 555 of FIG. 5B, for example, noting that the original DOG symbol 578 at row 5, column 5 of FIG. 5A did not have such a background originally). In this way, the green background color of the intermediate DOG symbol may indicate an association with verbs as a grammatical function or part of speech.

The PHONE symbol 759 (Row 6, Column 7) on the second level linked electronic screen overlay 501 in FIG. 5B may be triggered as the intermediate symbol in at least one sequence of three polysemous symbols beginning with the APPLE 526 and PHONE 759 symbols. When this symbol is triggered, a third level linked electronic screen overlay, named the "APPLE PHONE" overlay may be retrieved and displayed. The PHONE symbol 759 on the second level linked electronic overlay 501 in FIG. 5B may be used as an intermediate symbol in polysemous symbol sequences for producing different forms of the adjective "delicious," and the corresponding virtual key 765 may include visual indicators that may help an operator determine that it may be used as an intermediate symbol in polysemous symbol sequences for producing one or more adjectives. In particular, this key 765 may have a blue background color that is the same as the blue background color (note the horizontal lines on keys 540 and 765 indicating the common blue background color) found on the key 540 including the polysemous ADJECTIVE symbol 542 (Row 3, Column 9) of FIGS. 5A and 5B. In this way, the blue background color of the intermediate PHONE symbol may indicate an association with adjectives as a grammatical function or part of speech.

FIG. 5C shows a third level linked electronic screen overlay 581 with an 84 location virtual keyboard similar to the 84 location virtual keyboard of the first level electronic screen overlay in FIG. 5A. This overlay, named the "APPLE DOG" overlay, may be retrieved and displayed when the APPLE symbol 526 on the first level linked electronic screen overlay 500 is triggered and then the DOG symbol 553 on the corresponding second level linked electronic overlay 501 is triggered. Symbols on this overlay 581 may be selected as the third symbol in polysemous symbol sequences that begin with the APPLE 526 and DOG 553 symbols.

The available symbols on third level linked electronic screen overlay 581 of FIG. 5C may each be triggered or selected as the terminal symbol in various sequences of three polysemous symbols used to produce different forms of the verb "bite." These keys may have a green background color that is the same as the green background color (note the diagonal lines on each key indicating the common green background color) found on each key of FIG. 5C and the key 538 including the polysemous VERB symbol (Row 3, Column 3) of FIGS. 5A and 5B. The green background color of each of these symbols may indicate an association with verbs as a grammatical function or part of speech.

In at least one embodiment of an apparatus, method, computer readable medium and/or article of manufacture of the present invention, a plurality of polysemous symbol sequences may each correspond to one of a plurality of previously stored messages in association with at least one word, sentence, phoneme, message, letter, number, morpheme, command and/or phrase, as described above, where each of the plurality of polysemous symbol sequences may further correspond to a rationale relating the respective symbol sequence to the associated at least one word, sentence, phoneme, message, letter, number, morpheme, command and/or phrase, and each of the respective the rationales are useable to explain how the respective symbol sequence relates to the respective stored at least one word, sentence, phoneme, message, letter, number, morpheme, command and/or phrase.

FIG. 6 shows a non-limiting example embodiment of several entries of a dictionary 600 that includes a plurality of polysemous symbol sequences. Each row includes one entry in the dictionary 600. The first column 605 of dictionary 600 includes an alphabetized list of entries in the dictionary 600, each of which may correspond to a previously stored message of at least one of a word, sentence, phoneme, plural word message, letter, number, morpheme, command and/or phrase stored in memory 102 in association with a corresponding polysemous symbol sequence. The second column 615 and the third column 625 include two different parts of the definitions that correspond to each entry in the dictionary 600. The first part of the definition includes a polysemous symbol sequence in column 615 that may be triggered on sequentially linked electronic screen overlays to produce the corresponding previously stored message of column 605.

The second part of the definition includes a rationale in column 625 that explains an association between the corresponding polysemous symbol sequence in column 615 and the corresponding previously stored at least one word, sentence, phoneme, plural word message, letter, number, morpheme, command and/or phrase in column 605. In other words, the dictionary 600 includes a plurality of rationales, each respectively relating a respective one of the plurality of symbol sequences to a respective associated at least one word, sentence, phoneme, message, letters, number, morpheme, command and/or phrase, wherein each of the respective the rationales are useable to explain how the respective symbol sequence relates to the respective stored at least one word, sentence, phoneme, message, letter, number, morpheme, command and/or phrase.

In at least one embodiment of the present invention, there is an apparatus, computer readable medium, method and/or article of manufacture for a plurality of interactive visual scenes on electronic screen overlays useful for teaching a plurality of polysemous symbol sequences, relationships between polysemous symbol sequences and parts of speech, and rationales that explain the relationship between polysemous symbol sequences and corresponding previously stored messages of at least one of a word, sentence, phoneme, message, letter, number, morpheme, command and phrase.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of messages that can be produced using two-symbol sequences that begin with a common initial symbol, an APPLE symbol, for example.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of messages that can be produced using three-symbol sequences that begin with a common initial symbol, and a common intermediate symbol, an ELEPHANT symbol and a PHONE symbol, for example.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where this electronic screen overlay may be designed to help teach a plurality of polysemous symbol sequences that can be produced using a sequence beginning with one or more common initial symbols, as described above, and where one area of this electronic screen overlay may display the one or more common initial symbols.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of an electronic screen overlay may display the names of the one or more common initial symbols.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where triggering at least one area of the electronic screen overlay may trigger the system to speak the names of the one or more common initial symbols.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of the electronic screen overlay may display the names of the one or more common initial symbols, and where triggering the symbols in this area of the electronic screen overlay may trigger the system to speak the names of these symbols.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of the electronic screen overlay may include a visual scene that illustrates a plurality of at least one of a word, sentence, phoneme, message, letter, number, morpheme, command and phrase associated with the plurality of polysemous symbol sequences that can be produced using a sequence beginning with one or more common initial symbols. For example, an APPLE symbol may be associated with the words eat, hungry, hungrily, and food. One area of an electronic screen overlay may include a visual scene of a boy eating an apple to demonstrate these concepts.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of the electronic screen overlay may include a symbol sequence display area.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of the electronic screen overlay may include a symbol sequence display area, and where the one or more common initial symbols may be continuously displayed in the symbol sequence display area, even if one or more elements of one or more areas of the electronic screen overlay changes dynamically based on at least one recently triggered selection. In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where one area of the electronic screen overlay may include a text display area.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of polysemous symbols that may be used as terminal symbols in sequences beginning with the one or more common initial symbols.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of terminal symbols, as described above, where at least one of these terminal symbols may correspond to a grammatical function or part of speech, a verb form, adjective form, or noun form, for example.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of terminal symbols, as described above, where at least one of these terminal symbols may correspond to a grammatical function or part of speech, and where the background of the terminal symbol may be color-coded based on the corresponding grammatical function or part of speech, green to represent verbs, for example.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of terminal symbols, as described above, and where triggering a terminal symbol causes that symbol to appear in the symbol sequence display area following the one or more common initial symbols. Thus, all symbols of the most recently polysemous symbol sequence ending with the most recently triggered terminal symbol may be displayed in the symbol sequence display area.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of terminal symbols, as described above, and where triggering a terminal symbol causes the text of a previously stored message of at least one of a word, sentence, phoneme, message, letter, number, morpheme, command and phrase corresponding to a sequence of the one or more common initial symbols and the triggered terminal symbol to appear in the text display area.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may include a plurality of terminal symbols, as described above, and where triggering a terminal symbol causes the system to speak a previously stored message of at least one of a word, sentence, phoneme, message, letter, number, morpheme, command and phrase corresponding to a sequence of the one or more common initial symbols and the triggered terminal symbol.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may display at least one rationale to explain the relationship between a previously stored message and a corresponding sequence of one or more common initial symbols and a terminal symbol.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may display at least one rationale to explain the relationship between a previously stored message and a corresponding polysemous symbol sequence, as described above, and where the system speaks the rationale aloud if the area of the electronic screen overlay displaying the rationale is triggered.

In at least one embodiment of the present invention, there is an apparatus, computer readable medium, method and/or article of manufacture for a plurality of interactive visual scenes on electronic screen overlays useful for teaching a plurality of polysemous symbol sequences, as described above, where an electronic screen overlay may be designed to help teach a plurality of polysemous symbol sequences that can be produced using a sequence beginning with one or more common initial symbols, as described above, where at least one area of the electronic screen overlay may display a graphic illustration of the relationship between at least one previously stored message, of at least one of a word, sentence, phoneme, message, letter, number, morpheme, command and phrase, and a corresponding symbol sequence.

The graphic illustration may include a graphic illustration of a rationale that is also used to explain the relationship between a previously stored message and a corresponding symbol sequence.

The graphic illustration may include at least one of the at least one common initial symbols.

In at least one embodiment of the present invention, an apparatus, computer readable medium, method and/or article of manufacture is disclosed for a plurality of interactive visual scenes.

In at least one embodiment, the method comprises: providing polysemous symbols for selection on an initial electronic screen overlay displayed on a display; storing, in a memory, a plurality of the selectable polysemous symbols in association with a pointer identifying display of an electronic screen overlay which is different from the initial electronic screen overlay; displaying a second electronic screen overlay on the display, in response to an initial selection of one of the provided polysemous symbols, the second electronic screen overlay being the electronic screen overlay associated with the selected polysemous symbol; storing, in the memory, a plurality of visual scenes, each respective one of the plurality of visual scenes being stored in association with at least two symbol sequences beginning with the initially selected polysemous symbol; and displaying one of the plurality of visual scenes on the display, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

In at least one embodiment of the method, the second electronic screen overlay may be displayed in place of the initial electronic screen overlay; the plurality of visual scenes may each respectively relate each of a corresponding two or more symbol sequences to an associated stored at least one word, sentence, phoneme, message, letter, number, morpheme, command and phrase; and/or the plurality of visual scenes each respectively relate each of a corresponding two or more symbol sequences to an associated stored at least one word, sentence, phoneme, message, letter, number, morpheme, command and phrase. In at least one embodiment of the method, the visual scene may include a graphic illustration of a relationship between each of the respective at least two symbol sequences and the at least one respective associated word, sentence, phoneme, message, letter, number, morpheme, command and phrase. In at least one embodiment of the method, the graphic illustration may be usable to explain a rationale between each of the at least two symbol sequences and the at least one respective associated word, sentence, phoneme, message, letter, number, morpheme, command and phrase.

In at least one embodiment, the computer readable medium includes program segments for, when executed on computer system, causing the computer system to implement the method of at least one embodiment.

In at least one embodiment, the apparatus comprises: an integrated input and display device configured to provide polysemous symbols for selection on an initial electronic screen overlay displayed on a display; a memory to store a plurality of the selectable polysemous symbols in association with a pointer identifying display of an electronic screen overlay which is different from the initial electronic screen overlay; and a processor configured to control display of a second electronic screen overlay on the integrated input and display device, in response to an initial selection of one of the provided polysemous symbols, the second electronic screen overlay being the electronic screen overlay associated with the selected polysemous symbol, the memory being further configured to store a plurality of visual scenes, each respective one of the plurality of visual scenes being stored in association with at least two symbol sequences beginning with the initially selected polysemous symbol, and configured to control display of one of the plurality of visual scenes on the integrated input and display device, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

In at least one embodiment of the apparatus, the second electronic screen overlay may be displayed in place of the initial electronic screen overlay; the plurality of visual scenes may each respectively relate each of a corresponding two or more symbol sequences to an associated stored at least one word, sentence, phoneme, message, letter, number, morpheme, command and phrase; and/or the plurality of visual scenes each respectively relate each of a corresponding two or more symbol sequences to an associated stored at least one word, sentence, phoneme, message, letter, number, morpheme, command and phrase. In at least one embodiment of the apparatus, the visual scene may include a graphic illustration of a relationship between each of the respective at least two symbol sequences and the at least one respective associated word, sentence, phoneme, message, letter, number, morpheme, command and phrase. In at least one embodiment of the apparatus, the graphic illustration may be usable to explain a rationale between each of the at least two symbol sequences and the at least one respective associated word, sentence, phoneme, message, letter, number, morpheme, command and phrase.

Figure 7A:
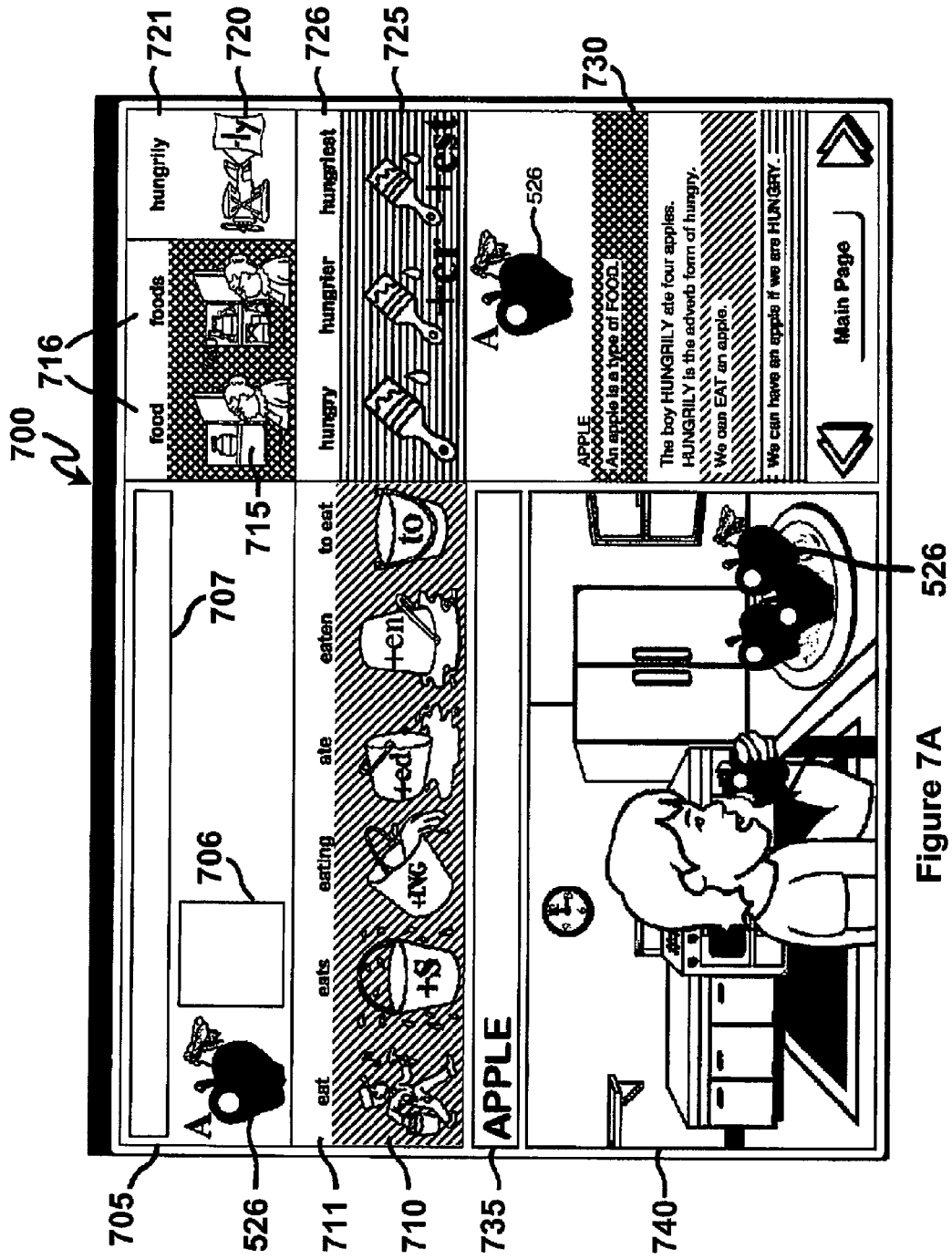
FIG. 7A-B each illustrate example embodiments of electronic screen overlays with one of a plurality of interactive visual scenes.
Figure 7B:
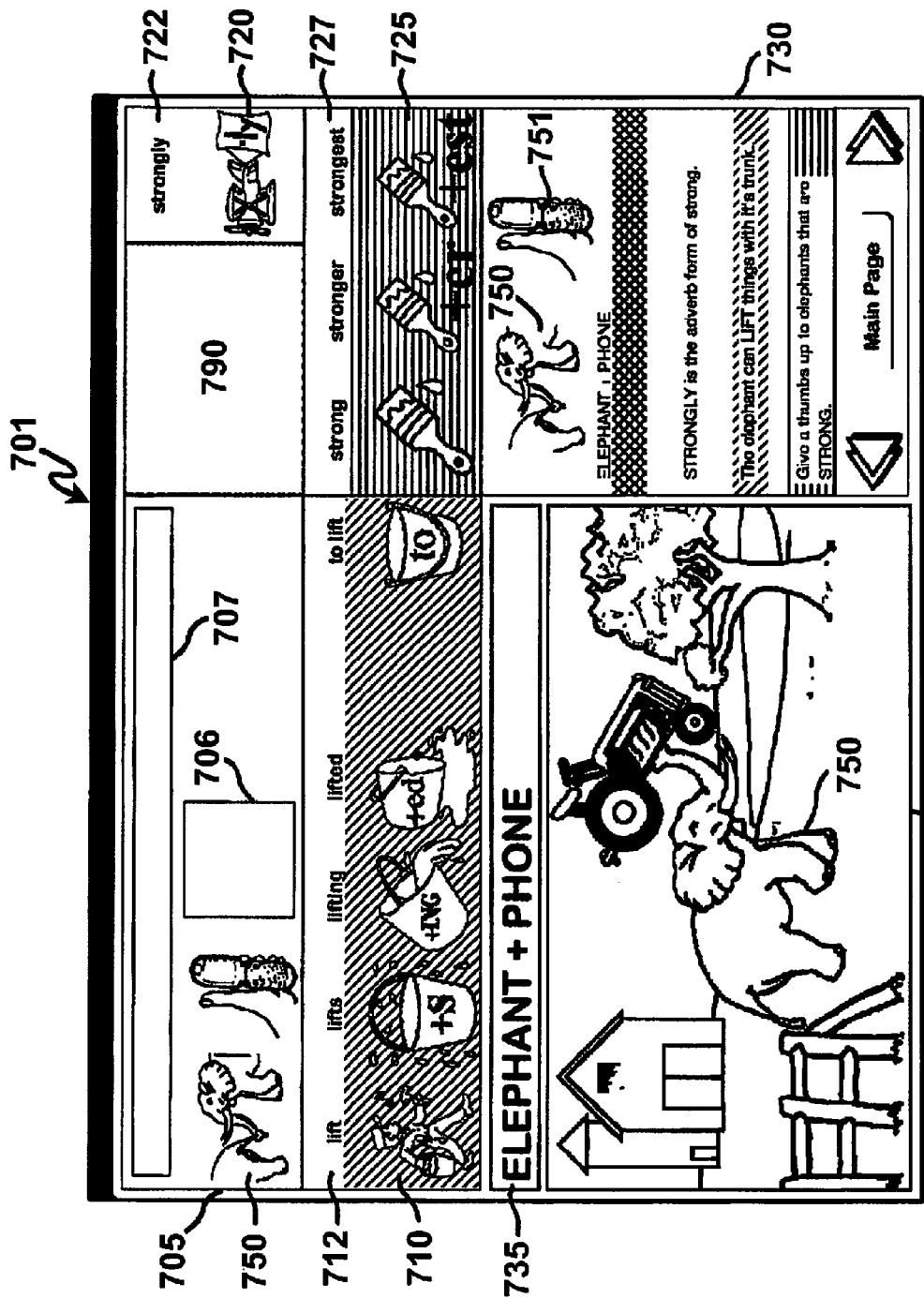

FIGS. 7A-B each illustrate example embodiments of electronic screen overlays with one of a plurality of interactive visual scenes designed to help teach a plurality of polysemous symbol sequences that can be produced using a sequence beginning with one or more common initial symbols. FIG. 7A shows an example embodiment of an electronic screen overlay 700 designed to help teach a plurality of polysemous symbol sequences that can each be produced using a polysemous symbol sequence beginning with one common initial symbol, namely the initial APPLE symbol 526. FIG. 7B shows an example embodiment of an electronic screen overlay 701 designed to help teach a plurality of polysemous symbol sequences that can each be produced using a polysemous symbol sequence beginning with two common initial symbols, namely the initial ELEPHANT symbol 750 and the intermediate PHONE symbol 751.

The electronic screen overlay 700 of FIG. 7A may be used for teaching a plurality of polysemous symbol sequences with two symbols, including an initial APPLE symbol 526 and one of a plurality of available terminal symbols. In an embodiment, symbol sequence display area 705 includes a display of the common initial APPLE symbol 526 and symbol display area 706 for displaying a selected one of a plurality of available terminal symbols (indicated by an empty square). In an embodiment, a plurality of terminal symbols may be displayed and available for selection in association with a text label. The text label associated with each of the plurality of terminal symbols may correspond to a previously stored message of at least one of a word, sentence, phoneme, message, letter, number, morpheme, command and phrase that may be produced if the associated terminal symbol is triggered. Triggering a selected one of the available plurality of terminal symbols may direct the processor 120 to control a display of the selected terminal symbol in terminal symbol display area 706. Triggering a selected one of the available plurality of terminal symbols may direct the processor to control a display of text label associated with the selected terminal symbol in message display area 707 (indicated by an empty rectangle). Triggering a selected one of the available plurality of terminal symbols may also direct the processor 120 to control a speech output of the associated previously stored message of at least one of a word, sentence, phoneme, message, letter, number, morpheme, command and phrase.

The plurality of available terminal symbols of electronic screen overlay 700 may include a plurality of polysemous verb form symbols 710, which may be triggered to produce different forms of the verb "eat," as shown in text labels 711. Each of the plurality of polysemous verb form symbols 710 may include visual indicators that may be associated with the grammatical function or part of speech of intermediate and terminal symbols in a plurality of polysemous symbols used to produce verbs, a green background color that may be unique to polysemous symbol sequences associated with verbs, for example.

The plurality of available terminal symbols of electronic screen overlay 700 may include a plurality of polysemous noun form symbols 715, which may be triggered to produce singular and plural forms of the noun "food," as shown in text labels 716. Each of the plurality of polysemous noun form symbols 715 may include visual indicators that may be associated with the grammatical function or part of speech of intermediate and terminal symbols in a plurality of polysemous symbol sequences used to produce nouns, an orange background color that may be unique to polysemous symbols associated with nouns, for example.

The plurality of available terminal symbols of electronic screen overlay 700 may include a polysemous adverb symbol 720, which may be triggered to produce the adverb "hungrily," as shown in text label 721. The adverb symbol 720 may include a visual indicator that may be associated with the grammatical function or part of speech of intermediate and terminal symbols in a plurality of polysemous symbol sequences used to produce nouns, a white background color that may be unique to polysemous symbols associated with adverbs, for example.

The plurality of available terminal symbols of electronic screen overlay 700 may include a plurality of polysemous adjective form symbols 725, which may be triggered to produce different forms of the adjective "hungry," as shown in text label 726. The adjective symbols 725 may include visual indicators that may be associated with the grammatical function or part of speech of intermediate and terminal symbols in a plurality of polysemous symbol sequences used to produce adjectives, a blue background color that may be unique to polysemous symbols associated with adjectives, for example.

In an embodiment of the electronic screen overlay 700 of FIG. 7A, a rationale display area 730 may include a display of a plurality of rationales to explain the relationship between a previously stored message of at least one of a word, sentence, phoneme, message, letter, number, morpheme, command and phrase corresponding two symbol sequence consisting of the common initial APPLE symbol 526 and each of a plurality of available terminal symbols. The rationale display area 730 may include a rationale to explain the polysemous symbol sequences for forms of the noun "food," which may be indicated by an orange background color, for example. The rationale display area 730 also includes a rationale to explain the polysemous symbol sequence for the adverb "hungrily," a rationale to explain the polysemous symbol sequences for forms of the verb "eat," and a rationale to explain the polysemous symbol sequences for forms of the adjective "hungry," each of which may be indicated by a corresponding background color. Triggering one of the displayed rationales of rationale display area 730 may direct the processor 120 to control a speech output of the triggered rationale.

In an embodiment of the electronic screen overlay 700 of FIG. 7A, the name of the common initial polysemous symbol may be displayed in symbol name field 735.

In an embodiment of the electronic screen overlay 700 of FIG. 7A, there is a graphic illustration 740 showing the relationship between at least one of the corresponding polysemous symbol sequences that may be produced using the common initial APPLE symbol 526 and one of the plurality of available terminal symbols. This graphic illustration 740 shows a boy eating an apple, and may be an illustration of one of the displayed rationales in rationale display area 730. Additionally, the common initial APPLE symbol 526 is included as part of the graphic illustration 740.

The electronic screen overlay 701 of FIG. 7B may be used for teaching a plurality of polysemous symbol sequences with three symbols, including an initial ELEPHANT symbol 750, an intermediate PHONE symbol 751, and one of a plurality of available terminal symbols. In an embodiment, the electronic screen overlay 701 of FIG. 7B has the same general configuration of electronic screen overlay 700 of FIG. 7A, but may be used to teach a different plurality of polysemous symbol sequences. Both of the common initial symbols, including the initial ELEPHANT symbol 750 and the intermediate PHONE symbol 751 may be displayed in symbol sequence display area 705 alongside terminal symbol display area 706. Triggering a selected one of the available plurality of terminal symbols may direct the processor 120 to populate terminal symbol display area 706 and message display space 707 as described above and may to direct the processor 120 to control a speech output of the associated previously stored message of at least one of a word, sentence, phoneme, message, letter, number, morpheme, command and phrase.

The plurality of available terminal symbols of electronic screen overlay 701 may include a plurality of polysemous verb form symbols 710, which may be triggered to produce different forms of the verb "lift," as shown in text labels 712.

The plurality of available terminal symbols of electronic screen overlay 701 may not include polysemous noun form symbols 715. However, blank space 790 occupies the space occupied by polysemous noun form symbols 715 on electronic screen overlay 701 so that the spatial organization of elements of each electronic screen overlays remains constant even when one or more terminal polysemous symbols is not available.

The plurality of available terminal symbols of electronic screen overlay 701 may include a polysemous adverb symbol 720, which may be triggered to produce the adverb "strongly," as shown in text label 722.

The plurality of available terminal symbols of electronic screen overlay 701 may include a plurality of polysemous adjective form symbols 725, which may be triggered to produce different forms of the adjective "strong," as shown in text label 727.

In an embodiment of the electronic screen overlay 701 of FIG. 7B, a rationale display area 730 may include a display of a plurality of rationales to explain the relationship between a previously stored message of at least one of a word, sentence, phoneme, message, letter, number, morpheme, command and phrase corresponding two symbol sequence consisting of the common initial ELEPHANT symbol 750, the common intermediate PHONE symbol 751, and each of a plurality of available terminal symbols. Graphic illustration 741 may show an elephant lifting a tractor, and may be an illustration of at least one of the rationales displayed in rationale display area 730. Graphic illustration 741 may include at least one of the two common initial symbols featured on electronic screen overlay 701, namely the common initial ELEPHANT symbol 750.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of an apparatus or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor 120). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
providing polysemous symbols for selection on an initial electronic screen overlay displayed on a display, a plurality of the polysemous symbols being displayed with at least one word;
storing, in a memory, a plurality of the selectable polysemous symbols in association with a pointer identifying display of an electronic screen overlay which is different from the initial electronic screen overlay;
displaying on the display, in response to initial selection of one of the provided polysemous symbols, a second electronic screen overlay different from the initial electronic screen overlay and including a plurality of symbols, each of the plurality of symbols of the second electronic screen overlay being associated with the selected polysemous symbol and at least one of the plurality of the polysemous symbols of the second electronic screen overlay being displayed with at least one word different from the at least one word displayed with a similarly situated polysemous symbol previously displayed for selection on the initial electronic screen overlay;

storing, in the memory, a plurality of visual scenes, each respective one of the plurality of visual scenes being stored in association with at least two symbol sequences beginning with the initially selected polysemous symbol; and displaying one of the plurality of visual scenes on the display, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

2. The method of claim 1, wherein the second electronic screen overlay is displayed in place of the initial electronic screen overlay.

3. The method of claim 2, wherein the plurality of visual scenes each respectively relate each of a corresponding two or more symbol sequences to an associated stored at least one word, sentence, phoneme, message, letter, number, morpheme, command and phrase.

4. The method of claim 1, wherein the plurality of visual scenes each respectively relate each of a corresponding two or more symbol sequences to an associated stored at least one word, sentence, phoneme, message, letter, number, morpheme, command and phrase.

5. The method of claim 1, wherein each of the respective at least two symbol sequences are stored in the memory in association with a corresponding one of the plurality of visual scenes and at least one associated word, sentence, phoneme, message, letter, number, morpheme, command and phrase.

6. The method of claim 5, wherein the visual scene includes a graphic illustration of a relationship between each of the respective at least two symbol sequences and the at least one respective associated word, sentence, phoneme, message, letter, number, morpheme, command and phrase.

7. The method of claim 6, wherein the graphic illustration is usable to explain a rationale between each of the at least two symbol sequences and the at least one respective associated word, sentence, phoneme, message, letter, number, morpheme, command and phrase.

8. A non-transitory computer readable medium including program segments for, when executed on computer system, causing the computer system to implement the method of claim 1.

9. An apparatus, comprising:
an integrated input and display device configured to provide polysemous symbols for selection on an initial electronic screen overlay displayed on a display, a plurality of the polysemous symbols being displayed with at least one word;

a memory to store a plurality of the selectable polysemous symbols in association with a pointer identifying display of an electronic screen overlay which is different from the initial electronic screen overlay; and a processor configured to
control display of a second electronic screen overlay on the integrated input and display device, in response to an initial selection of one of the provided polysemous symbols, the second electronic screen overlay being different from the initial electronic screen overlay and including a plurality of symbols, each of the plurality of symbols of the electronic screen overlay being associated with the selected polysemous symbol and at least one of the plurality of the polysemous symbols of the second electronic screen overlay being displayed with at least one word different from the at least one word displayed with a similarly situated polysemous symbol previously displayed for selection on the initial electronic screen overlay, the memory being further configured to store a plurality of visual scenes, each respective one of the plurality of visual scenes being stored in association with at least two symbol sequences beginning with the initially selected polysemous symbol, and control display of one of the plurality of visual scenes on the integrated input and display device, in response to selection of one of the symbols on the displayed second electronic screen overlay, the displayed visual scene being stored in the memory in association with at least two symbol sequences including, in sequence, the initially selected polysemous symbol and the selected one of the symbols on the displayed second electronic screen overlay.

10. The apparatus of claim 9, wherein the processor is further configured to control display of the second electronic screen overlay on the integrated input and display device in place of the initial electronic screen overlay.

11. The apparatus of claim 10, wherein the plurality of visual scenes each respectively relate each of a corresponding two or more symbol sequences to an associated stored at least one word, sentence, phoneme, message, letter, number, morpheme, command and phrase.

12. The apparatus of claim 9, wherein the plurality of visual scenes each respectively relate each of a corresponding two or more symbol sequences to an associated stored at least one word, sentence, phoneme, message, letter, number, morpheme, command and phrase.

13. The apparatus of claim 9, wherein each of the respective at least two symbol sequences are stored in the memory in association with a corresponding one of the plurality of visual scenes and at least one associated word, sentence, phoneme, message, letter, number, morpheme, command and phrase.

14. The apparatus of claim 13, wherein the visual scene includes a graphic illustration of a relationship between each of the respective at least two symbol sequences and the at least one respective associated word, sentence, phoneme, message, letter, number, morpheme, command and phrase.

15. The apparatus of claim 14, wherein the graphic illustration is usable to explain a rationale between each of the at least two symbol sequences and the at least one respective associated word, sentence, phoneme, message, letter, number, morpheme, command and phrase.

* * * * *